US012664562B2

(12) United States Patent
Shukla et al.

(10) Patent No.: US 12,664,562 B2
(45) Date of Patent: Jun. 23, 2026

(54) SYSTEMS AND METHODS FOR USING MACHINE LEARNING ALGORITHMS TO FORECAST PROMOTIONAL DEMAND OF PRODUCTS

(71) Applicant: CVS Pharmacy, Inc., Woonsocket, RI (US)

(72) Inventors: Samta Shukla, Woonsocket, RI (US); Mukul Sankule, Woonsocket, RI (US); Diego Juarez, Woonsocket, RI (US); Delfina Iriarte, Woonsocket, RI (US); Nicolás García Aramouni, Woonsocket, RI (US); John R. Cybulski, Woonsocket, RI (US); Halil Cobuloglu, Woonsocket, RI (US)

(73) Assignee: CVS Pharmacy, Inc., Woonsocket, RI (US)

( * ) Notice: Subject to any disclaimer, the term of this patent is extended or adjusted under 35 U.S.C. 154(b) by 477 days.

(21) Appl. No.: 18/110,816

(22) Filed: Feb. 16, 2023

(65) Prior Publication Data

US 2024/0281831 A1     Aug. 22, 2024

(51) Int. Cl.
*G06Q 30/00* (2023.01)
*G06N 20/00* (2019.01)
(Continued)

(52) U.S. Cl.
CPC ......... *G06Q 30/0202* (2013.01); *G06N 20/00* (2019.01); *G06Q 30/0204* (2013.01)

(58) Field of Classification Search
USPC ....................... 705/7.31, 7.29, 7.33, 28, 7.11
See application file for complete search history.

(56) References Cited

U.S. PATENT DOCUMENTS 7,689,456 B2 * 3/2010 Schroeder .............. G06Q 10/04
705/7.31
7,899,691 B1 * 3/2011 Lee ........................ G06Q 10/02
705/5
(Continued)

OTHER PUBLICATIONS

Arif, Md Ariful Islam, et al. "Comparison study: product demand forecasting with machine learning for shop." 2019 8th International Conference System Modeling and Advancement in Research Trends (SMART). IEEE, 2019. (Year: 2019).*
(Continued)

*Primary Examiner* — Gurkanwaljit Singh
(74) *Attorney, Agent, or Firm* — Leydig, Voit & Mayer, Ltd.

(57) ABSTRACT

A method is provided. The method includes: obtaining a new marketing promotion for a particular product; determining, based on the particular product, a first product segment from a plurality of product segments; determining, by the PFCS, one or more promotional forecasting machine learning-artificial intelligence (ML-AI) models from a plurality of promotional forecasting ML-AI models to use for the new marketing promotion based on the first product segment; inputting promotional information associated with the new marketing promotion into the one or more determined promotional forecasting ML-AI models to forecast an amount of the particular product to provide to one or more storefronts; and providing product information indicating the amount of the particular product to one or more facility computing systems associated with the one or more storefronts.

20 Claims, 17 Drawing Sheets

(51) Int. Cl.
G06Q 30/0202 (2023.01)
G06Q 30/0204 (2023.01)

(56) References Cited

U.S. PATENT DOCUMENTS

| | | | | |
|---|---|---|---|---|
| 8,229,781 | B2 * | 7/2012 | Zenor | G06Q 30/0202 705/7.34 |
| 11,922,440 | B2 * | 3/2024 | Lei | G06Q 30/0201 |
| 2002/0169657 | A1 * | 11/2002 | Singh | G06Q 10/06 705/7.31 |
| 2005/0096963 | A1 * | 5/2005 | Myr | G06Q 30/0206 705/7.35 |
| 2007/0016494 | A1 * | 1/2007 | Brown | G06Q 10/087 705/28 |
| 2008/0294996 | A1 * | 11/2008 | Hunt | G06Q 30/02 707/999.102 |
| 2009/0006182 | A1 * | 1/2009 | Gammon | G06Q 30/0202 705/7.33 |
| 2010/0138281 | A1 * | 6/2010 | Zhang | G06Q 10/087 705/28 |
| 2013/0346150 | A1 * | 12/2013 | Beddo | G06Q 10/04 705/7.31 |
| 2014/0108094 | A1 * | 4/2014 | Beddo | G06Q 30/0202 705/7.31 |
| 2015/0127438 | A1 * | 5/2015 | Wedderburn | G06Q 30/0214 705/14.16 |
| 2015/0134413 | A1 * | 5/2015 | Deshpande | G06Q 30/0205 705/7.31 |
| 2016/0247172 | A1 * | 8/2016 | Lei | G06Q 30/0202 |
| 2016/0247175 | A1 * | 8/2016 | Milton | H04W 4/029 |
| 2017/0193435 | A1 * | 7/2017 | Sarin | G06Q 10/087 |
| 2020/0074402 | A1 * | 3/2020 | Adato | G06V 20/52 |
| 2021/0027321 | A1 * | 1/2021 | Matsubayashi | G06Q 10/04 |
| 2021/0117995 | A1 * | 4/2021 | Kansara | G06N 5/01 |
| 2021/0334845 | A1 * | 10/2021 | Keng | G06Q 30/0201 |
| 2021/0383286 | A1 * | 12/2021 | Kobe | G06Q 10/04 |
| 2024/0193536 | A1 * | 6/2024 | Panikkar | G06Q 10/083 |

OTHER PUBLICATIONS

Krishna, Akshay, et al. "Sales-forecasting of retail stores using machine learning techniques." 2018 3rd international conference on computational systems and information technology for sustainable solutions (CSITSS). IEEE, 2018. (Year: 2018).*

Sun, Zhan-Li, et al. "Sales forecasting using extreme learning machine with applications in fashion retailing." Decision support systems 46.1 (2008): 411-419. (Year: 2008).*

Brownlee, Jason "How to Convert a Time Series to a Supervised Learning Problem in Python," https://machinelearningmastery.com/convert-time-series-supervised-learning-problem-python/ (May 8, 2017).

* cited by examiner

100

202

Processor ~ 204

ROM ~ 206

RAM ~ 208

Storage ~ 210

Network
Interface ~ 212

Bus

200

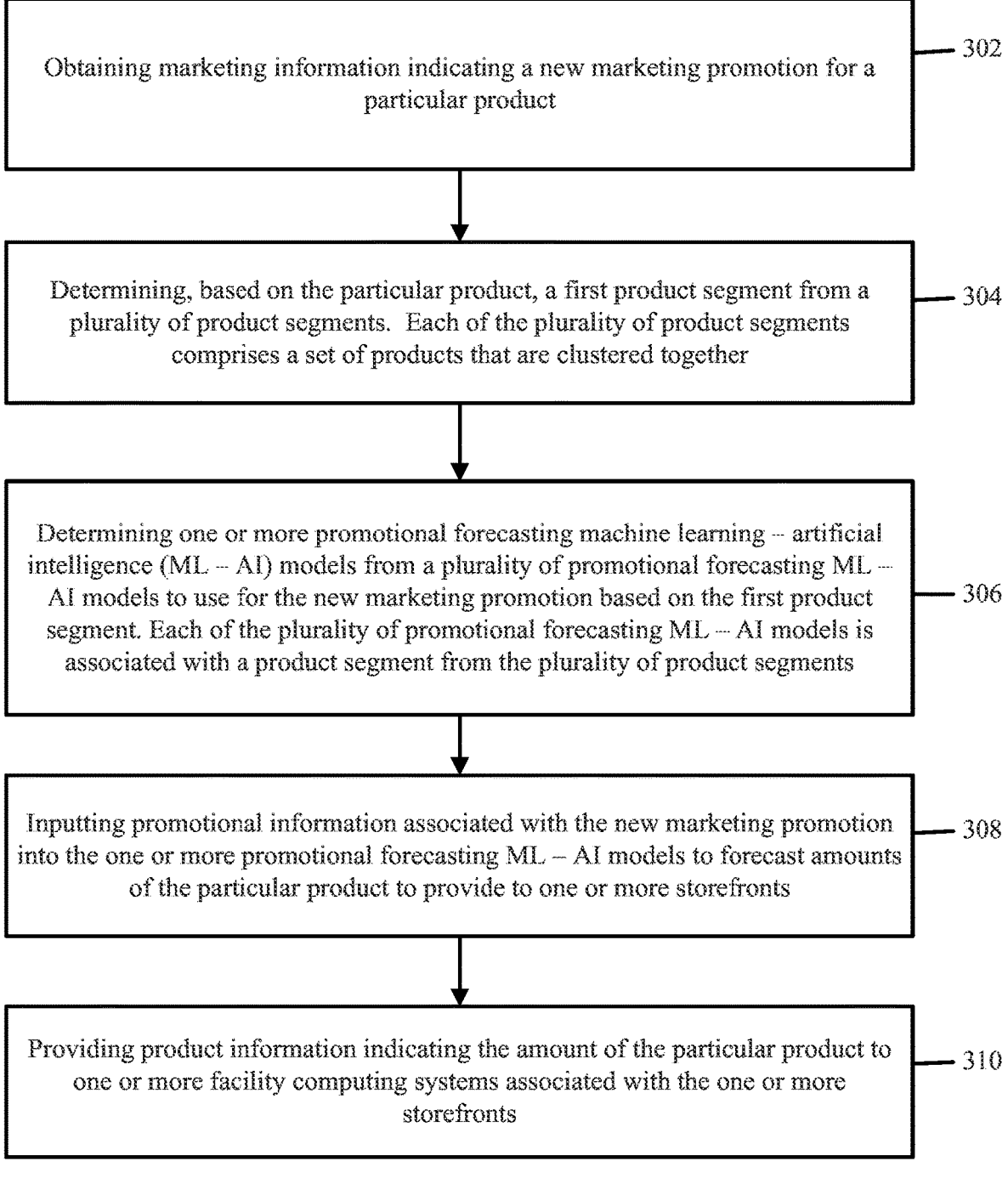

Obtaining marketing information indicating a new marketing promotion for a particular product — 302

Determining, based on the particular product, a first product segment from a plurality of product segments. Each of the plurality of product segments comprises a set of products that are clustered together — 304

Determining one or more promotional forecasting machine learning – artificial intelligence (ML – AI) models from a plurality of promotional forecasting ML – AI models to use for the new marketing promotion based on the first product segment. Each of the plurality of promotional forecasting ML – AI models is associated with a product segment from the plurality of product segments — 306

Inputting promotional information associated with the new marketing promotion into the one or more promotional forecasting ML – AI models to forecast amounts of the particular product to provide to one or more storefronts — 308

Providing product information indicating the amount of the particular product to one or more facility computing systems associated with the one or more storefronts — 310

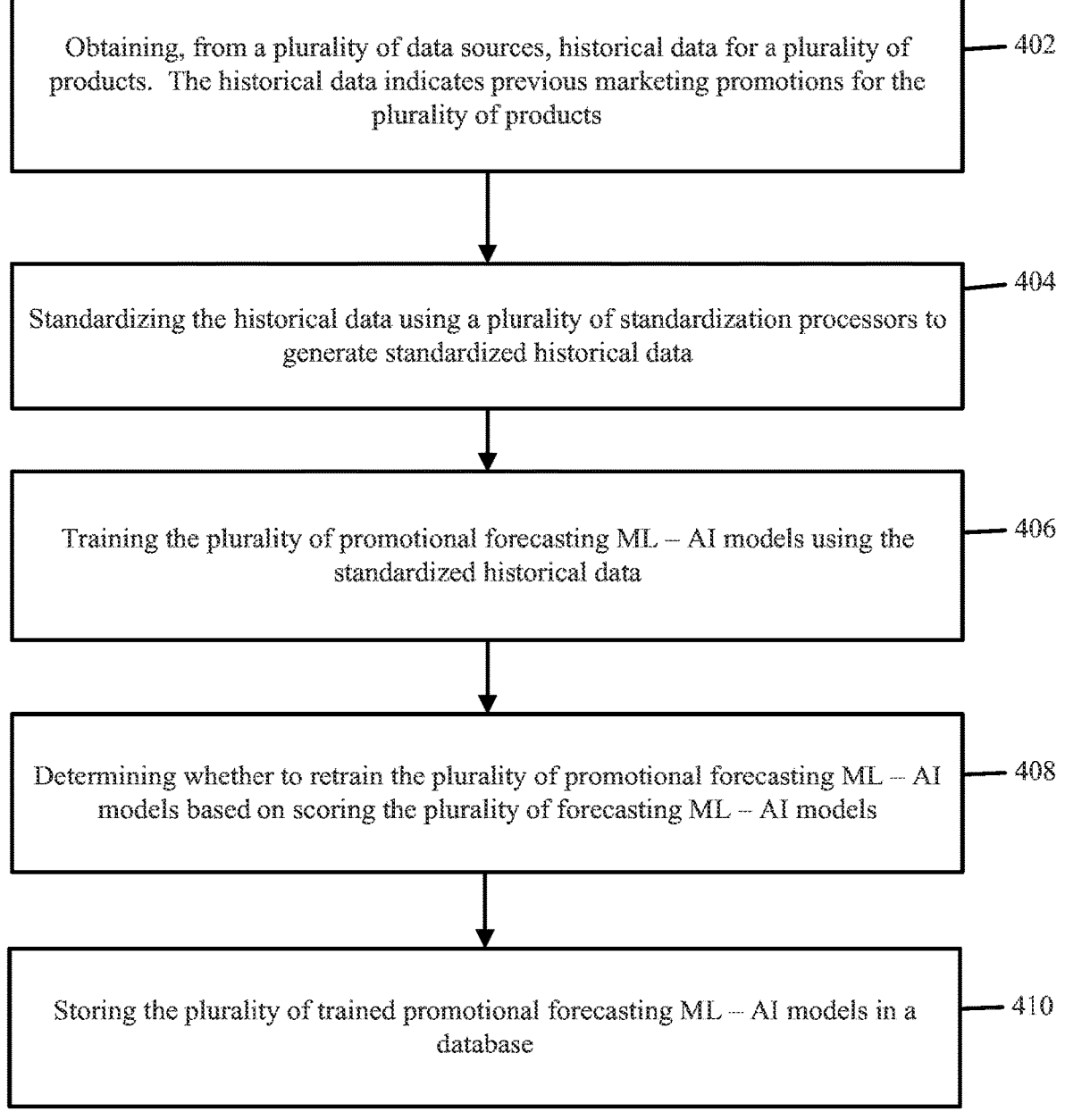

Obtaining, from a plurality of data sources, historical data for a plurality of products. The historical data indicates previous marketing promotions for the plurality of products ⏤ 402

Standardizing the historical data using a plurality of standardization processors to generate standardized historical data ⏤ 404

Training the plurality of promotional forecasting ML – AI models using the standardized historical data ⏤ 406

Determining whether to retrain the plurality of promotional forecasting ML – AI models based on scoring the plurality of forecasting ML – AI models ⏤ 408

Storing the plurality of trained promotional forecasting ML – AI models in a database ⏤ 410

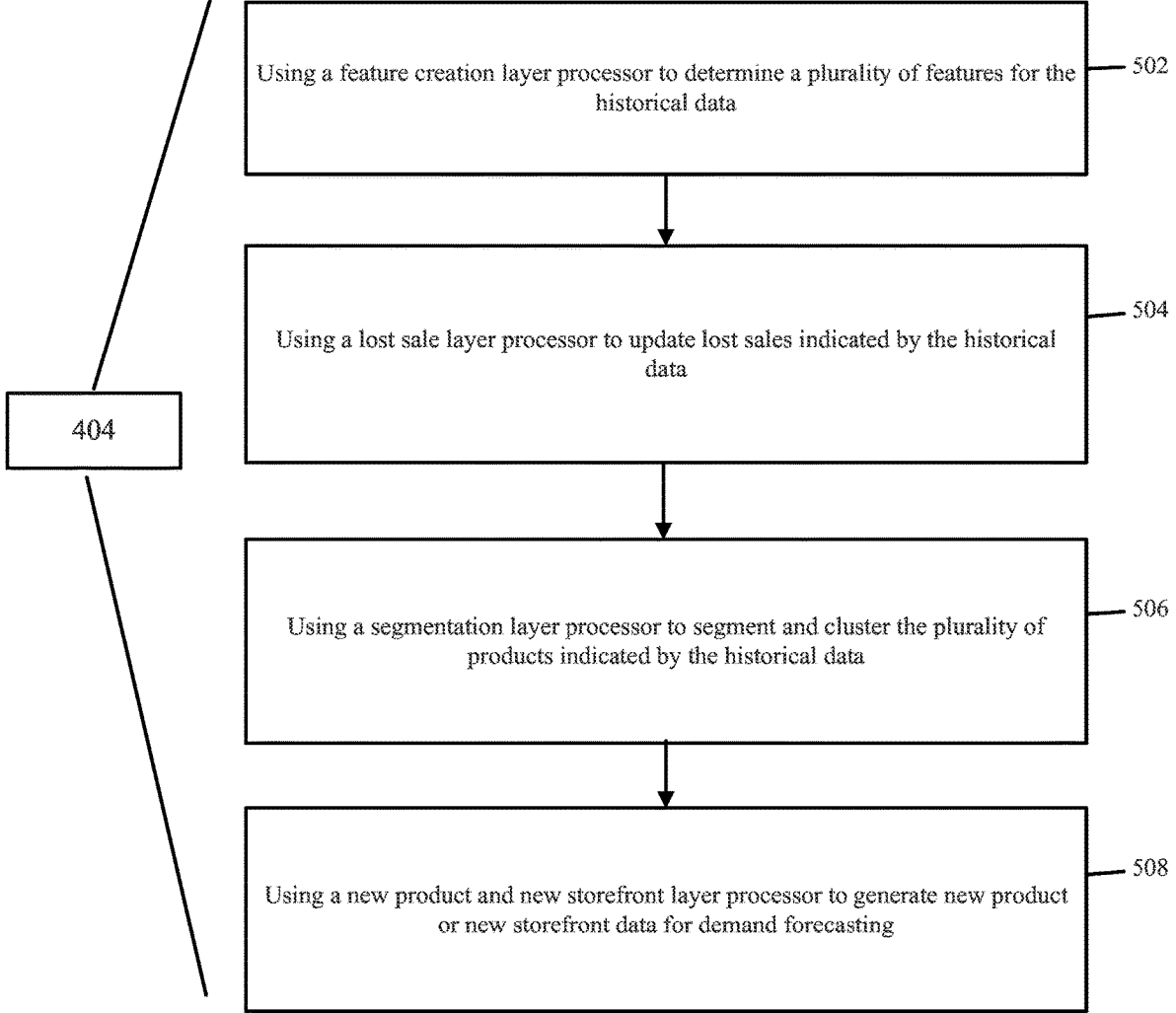

404

Using a feature creation layer processor to determine a plurality of features for the historical data ─ 502

Using a lost sale layer processor to update lost sales indicated by the historical data ─ 504

Using a segmentation layer processor to segment and cluster the plurality of products indicated by the historical data ─ 506

Using a new product and new storefront layer processor to generate new product or new storefront data for demand forecasting ─ 508

| | Feature 1 | Feature 2 | Feature 3 | Feature 4 | Feature 5 | Feature 6 | Feature 7 | Feature 8 | Feature 9 | Feature 10 |
|---|---|---|---|---|---|---|---|---|---|---|
| SKU – Week 1 | | | | | | | | | | |
| SKU – Week 2 | | | | | | | | | | |
| SKU – Week 3 | | | | | | | | | | |
| SKU – Week 4 | | | | | | | | | | |
| SKU – Week 5 | | | | | | | | | | |
| SKU – Week 6 | | | | | | | | | | |
| SKU – Week 7 | | | | | | | | | | |
| SKU – Week 8 | | | | | | | | | | |
| SKU – Week 9 | | | | | | | | | | |
| SKU – Week 10 | | | | | | | | | | |
| SKU – Week 11 | | | | | | | | | | |
| SKU – Week 12 | | | | | | | | | | |
| SKU – Week 13 | | | | | | | | | | |
| SKU – Week 14 | | | | | | | | | | |
| SKU – Week 15 | | | | | | | | | | |
| SKU – Week 16 | | | | | | | | | | |
| SKU – Week 17 | | | | | | | | | | |
| SKU – Week 18 | | | | | | | | | | |

| | Feature 1 | Feature 2 | Feature 3 | Feature 4 | Feature 5 | Feature 6 | Feature 7 | Feature 8 | Feature 9 | Feature 10 |
|---|---|---|---|---|---|---|---|---|---|---|
| Segment - Week 1 | | | | | | | | | | |
| Segment - Week 2 | | | | | | | | | | |
| Segment - Week 3 | | | | | | | | | | |
| Segment - Week 4 | | | | | | | | | | |
| Segment - Week 5 | | | | | | | | | | |
| Segment - Week 6 | | | | | | | | | | |
| Segment - Week 7 | | | | | | | | | | |
| Segment - Week 8 | | | | | | | | | | |
| Segment - Week 9 | | | | | | | | | | |
| Segment - Week 10 | | | | | | | | | | |
| Segment - Week 11 | | | | | | | | | | |
| Segment - Week 12 | | | | | | | | | | |
| Segment - Week 13 | | | | | | | | | | |
| Segment - Week 14 | | | | | | | | | | |
| Segment - Week 15 | | | | | | | | | | |
| Segment - Week 16 | | | | | | | | | | |
| Segment - Week 17 | | | | | | | | | | |
| Segment - Week 18 | | | | | | | | | | |

SYSTEMS AND METHODS FOR USING MACHINE LEARNING ALGORITHMS TO FORECAST PROMOTIONAL DEMAND OF PRODUCTS

BACKGROUND

Enterprise organizations (e.g., retail corporations) use numerous different promotions as part of their business strategy. For example, products may be provided with a promotion such as buy one get one free, buy two and get a dollar off, and so on. Because enterprise organizations may include numerous retail locations (e.g., over 9,000 retail storefronts) with a number of different products (e.g., over 30,000 products) and each of the retail locations may have specific sets of promotions, this can add up to over fifty million different store-item combinations of promotions each week. To account for the increased demand when the promotion is running, each retail location needs to be stocked with enough of the product to last throughout the promotion. Unfortunately, each retail location, even if they are running the same promotion for the same product, may have a different demand of the product. For instance, a retail location that is in the northeastern area of the United States that is about to encounter a snowstorm may have a different demand for a particular product (e.g., bottles of water) than a retail location with perfect weather in the southern area of the United States. Therefore, it becomes difficult to predict the amount of product to supply to each of the different retail locations for each of the different promotions. Accordingly, there remains a technical need to forecast the demand of the products for the numerous retail locations as the different promotions are running each and every week.

SUMMARY

In some examples, the present application uses one or more promotional forecasting machine learning-artificial intelligence (ML-AI) models to forecast demands for products (e.g., items) that are on promotion for an enterprise organization. For instance, the promotional forecasting computing system utilizes clustering, time-series forecasting, and/or optimization algorithms to predict demands for products on promotion at the retail locations. In some instances, the promotions for the products may change periodically (e.g., on a weekly basis). Accordingly, the promotional forecasting computing system may forecast demands for products for a plurality of retail locations (e.g., over 9,000 retail locations) on a weekly basis. Each of the retail stores may further be located across different geographical regions, and thus the promotional forecasting computing system may forecast different demands for the products at these different geographical locations even if the same promotion is running. In some variations, the promotional forecasting computing system may forecast the demand for the products in advance (e.g., eight weeks ahead or twelve weeks ahead) so as to obtain the necessary lead time for the products to arrive to the retail locations from distribution centers (DCs).

In operation, the promotional forecasting computing system may obtain and/or ingest data from a plurality of data sources. The data may include sales history, product-level attributes, store-level attributes, previous promotional offers, and/or other information. The promotional forecasting computing system may then standardize the data (e.g., the historical data) such as by performing feature creation, determining data for lost sales, segment/cluster products and/or stores, and/or generate new data for new products and/or stores. Afterwards, the promotional forecasting computing system may train a plurality of promotional forecasting ML-AI models to use for forecasting demand for one or more products. For example, after receiving a new marketing promotion, the promotional forecasting computing system may select one or more promotional forecasting ML-AI models and use the selected promotional forecasting ML-AI models to forecast amounts of the product to provide to one or more storefronts (e.g., retail locations). The promotional forecasting computing system may provide product information indicating the forecasted amount to other computing systems to ensure the product is in-stock during promotional period for the new marketing promotion.

In one aspect, a method is provided. The method comprises: obtaining, by a promotional forecasting computing system (PFCS), a new marketing promotion for a particular product; determining, by the PFCS and based on the particular product, a first product segment from a plurality of product segments, wherein each of the plurality of product segments comprises a set of products that are clustered together; determining, by the PFCS, one or more promotional forecasting machine learning-artificial intelligence (ML-AI) models from a plurality of promotional forecasting ML-AI models to use for the new marketing promotion based on the first product segment, wherein each of the plurality of promotional forecasting ML-AI models is associated with a product segment from the plurality of product segments; inputting, by the PFCS, promotional information associated with the new marketing promotion into the one or more determined promotional forecasting ML-AI models to forecast an amount of the particular product to provide to one or more storefronts; and providing, by the PFCS, product information indicating the amount of the particular product to one or more facility computing systems associated with the one or more storefronts.

Examples may include one of the following features, or any combination thereof. For instance, in some examples, each of the plurality of promotional forecasting ML-AI models is further associated with a storefront from a plurality of storefronts associated with an enterprise organization, and wherein selecting the one or more promotional forecasting ML-AI model is based on: comparing the first product segment with the plurality of product segments; and comparing the one or more storefronts with the plurality of storefronts.

In some instances, inputting the promotional information associated with the new marketing promotion into the one or more selected promotional forecasting ML-AI models comprises: inputting the promotional information into a first selected promotional forecasting ML-AI model associated with a first storefront, from the one or more storefronts, to forecast a first amount of the particular product to provide to the first storefront; and inputting the promotional information into a second selected promotional forecasting ML-AI model associated with a second storefront, from the one or more storefronts, to forecast a second amount of the particular product to provide to the second storefront, wherein the second amount is different from the first amount.

In some examples, the method further comprises: obtaining historical data for a plurality of products; standardizing the historical data using a plurality of standardization processors to generate standardized historical data; and training the plurality of promotional forecasting ML-AI models using the standardized historical data.

In some variations, obtaining the historical data for the plurality of products comprises: determining lagging information for the plurality of products based on the historical data, and wherein training the plurality of promotional forecasting ML-AI models is based on the lagging information.

In some instances, standardizing the historical data comprises: determining a plurality of features for the plurality of products, wherein each of the plurality of features indicates an input that is used for training the plurality of promotional forecasting ML-AI models; and populating one or more arrays based on the plurality of features, wherein the standardized historical data comprises the one or more arrays.

In some examples, standardizing the historical data comprises: determining a plurality of sub-groups for the plurality of products using a dynamic time warping (DTW) algorithm; and determining the plurality of product segments based on determining whether each of the plurality of sub-groups exceeds a maximum data size limit.

In some variations, determining the plurality of product segments is further based on determining whether each of the plurality of sub-groups is below a minimum data size limit.

In some instances, standardizing the historical data comprises: obtaining one or more indications indicating one or more new products or one or more new storefronts that do not have historical data; and generating new product data for the one or more new products or new storefront data for the one or more new storefronts, and wherein generating the standardized historical data is based on the new product data or the new storefront data.

In some examples, generating the new product data or the new storefront data is based on determining similar products to the one or more new products or similar storefronts to the one or more new storefronts.

In some variations, standardizing the historical data comprises: determining one or more lost sales entries within the historical data, wherein the one or more lost sales entries indicate the particular product being out of stock during a time period; generating new sales data for the one or more lost sales entries; and populating the one or more lost sales entries with the new sales data.

In some instances, the plurality of promotional forecasting ML-AI models are Light gradient-boosting machine (LightGBM) models, and wherein training the plurality of promotional forecasting ML-AI models is based on using a customized loss function.

In some examples, the customized loss function is based on a sales velocity associated with the particular product and a margin rate associated with the particular product.

In some variations, the method further comprises: determining whether to retrain the plurality of promotional forecasting ML-AI models; and storing the plurality of promotional forecasting ML-AI models in memory.

In some instances, determining whether to retrain the plurality of promotional forecasting ML-AI models comprises retraining the plurality of promotional forecasting ML-AI models periodically after a set amount of time has elapsed.

In another aspect, a promotional forecasting computing system (PFCS) comprising one or more processors and non-transitory computer-readable medium having processor-executable instructions stored thereon is provided. The processor-executable instructions, when executed by the one or more processors, facilitate: obtaining a new marketing promotion for a particular product; determining, based on the particular product, a first product segment from a plurality of product segments, wherein each of the plurality of product segments comprises a set of products that are clustered together; determining one or more promotional forecasting machine learning-artificial intelligence (ML-AI) models from a plurality of promotional forecasting ML-AI models to use for the new marketing promotion based on the first product segment, wherein each of the plurality of promotional forecasting ML-AI models is associated with a product segment from the plurality of product segments; inputting promotional information associated with the new marketing promotion into the one or more determined promotional forecasting ML-AI models to forecast an amount of the particular product to provide to one or more storefronts; and providing product information indicating the amount of the particular product to one or more facility computing systems associated with the one or more storefronts.

Examples may include one of the following features, or any combination thereof. For instance, in some examples, each of the plurality of promotional forecasting ML-AI models is further associated with a storefront from a plurality of storefronts associated with an enterprise organization, and wherein selecting the one or more promotional forecasting ML-AI model is based on: comparing the first product segment with the plurality of product segments; and comparing the one or more storefronts with the plurality of storefronts.

In some instances, inputting the promotional information associated with the new marketing promotion into the one or more selected promotional forecasting ML-AI models comprises: inputting the promotional information into a first selected promotional forecasting ML-AI model associated with a first storefront, from the one or more storefronts, to forecast a first amount of the particular product to provide to the first storefront; and inputting the promotional information into a second selected promotional forecasting ML-AI model associated with a second storefront, from the one or more storefronts, to forecast a second amount of the particular product to provide to the second storefront, wherein the second amount is different from the first amount.

In some variations, the processor-executable instructions, when executed by the one or more processors, further facilitate: obtaining historical data for a plurality of products; standardizing the historical data using a plurality of standardization processors to generate standardized historical data; and training the plurality of promotional forecasting ML-AI models using the standardized historical data.

In yet another aspect, a non-transitory computer-readable medium having processor-executable instructions stored thereon is provided. The processor-executable instructions, when executed, facilitate: obtaining a new marketing promotion for a particular product; determining, based on the particular product, a first product segment from a plurality of product segments, wherein each of the plurality of product segments comprises a set of products that are clustered together; determining one or more promotional forecasting machine learning-artificial intelligence (ML-AI) models from a plurality of promotional forecasting ML-AI models to use for the new marketing promotion based on the first product segment, wherein each of the plurality of promotional forecasting ML-AI models is associated with a product segment from the plurality of product segments; inputting promotional information associated with the new marketing promotion into the one or more determined promotional forecasting ML-AI models to forecast an amount of the particular product to provide to one or more storefronts; and providing product information indicating the amount of the particular product to one or more facility computing systems associated with the one or more storefronts.

All examples and features mentioned above may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following:

FIG. 3 is an exemplary process for using the promotional forecasting ML-AI model to forecast promotional products in accordance with one or more examples of the present application.

FIG. 4 is another exemplary process using the promotional forecasting ML-AI model to forecast promotional products in accordance with one or more examples of the present application.

FIG. 5 is yet another exemplary process using the promotional forecasting ML-AI model to forecast promotional products in accordance with one or more examples of the present application.

FIGS. 6A and 6B show exemplary arrays for the standardized historical data to be used for training the promotional forecasting ML-AI models in accordance with one or more examples of the present application.

DETAILED DESCRIPTION

Examples of the presented application will now be described more fully hereinafter with reference to the accompanying FIGs., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
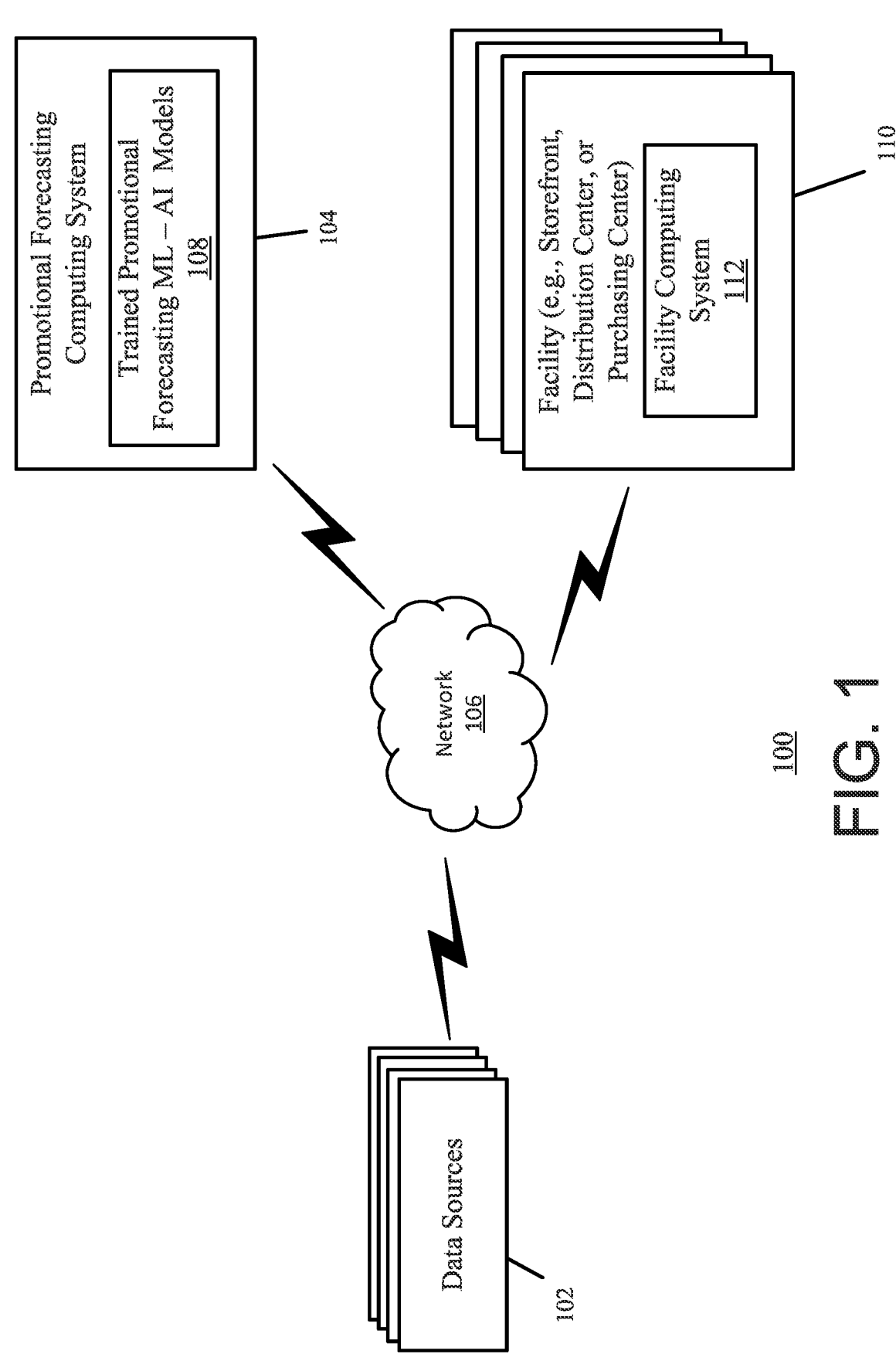
FIG. 1 is a simplified block diagram depicting an exemplary computing environment in accordance with one or more examples of the present application.

Systems, methods, and computer program products are herein disclosed that use promotional forecasting ML-AI models to forecast promotional products. FIG. 1 is a simplified block diagram depicting an exemplary environment in accordance with an example of the present application. The environment 100 includes a plurality of data sources 102, a promotional forecasting computing system 104, and a plurality of facilities 110 (e.g., storefronts or distribution centers). The promotional forecasting computing system 104 includes trained promotional forecasting models 108. The plurality of facilities include facility computing systems 112. Although the entities within environment 100 may be described below and/or depicted in the FIGs. as being singular entities, it will be appreciated that the entities and functionalities discussed herein may be implemented by and/or include one or more entities. For instance, the promotional forecasting computing system 104 may be separate computing entities located in a same location or in separate geographic locations that use the network 106 to communicate between each other as well as other devices or entities within environment 100.

The entities within the environment 100 such as the data sources 102, the promotional forecasting computing system 104, and the facilities 110 (e.g., the facility computing systems 112) may be in communication with other systems or facilities within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100. In some instances, one or more entities within the environment 100 may communicate with each other without using the network 106 (e.g., via communication protocols such as WI-FI or BLUTOOTH or via wired connections). For instance, one or more of the data sources 102 may be associated with an enterprise organization. The promotional forecasting computing system 104 may further be associated with the enterprise organization. As such, these data sources 102 and the promotional forecasting computing system 104 may communicate with each without using the network 106.

Each of the data sources 102 is and/or includes one or more computing devices, platforms, and/or systems that are configured to receive, obtain, generate, store, ingest, and/or otherwise process data such as historical data. The data sources 102 may further provide or transmit the data to another entity within environment 100 such as the promotional forecasting computing system 104. In some examples, the data sources 102 are and/or include one or more computing devices, computing platforms, systems, servers, desktops, laptops, tablets, mobile devices (e.g., smartphone device, or other mobile device), or any other type of computing device that generally comprises one or more communication components, one or more processing components, and one or more memory components.

The data sources 102 are capable of performing tasks, functions, and/or other actions associated with an enterprise organization. For example, the data sources 102 may be a source that provides historical data to the promotional forecasting computing system 104. For instance, the data sources 102 may obtain (e.g., receive, track, and/or generate) the historical data such as the sales data for a plurality of products at a plurality of different storefronts and/or promotional data for the products. For example, each storefront may include a computing system (e.g., a facility computing system 112) that tracks the amount of product sold over a period of time, including the amount of product sold for particular promotions (e.g., a buy one get one free promotion). Then, the storefronts may provide this historical data to the data sources 102 and/or the data sources 102 may track this historical data for the different storefronts. Subsequently, the data sources 102 may then provide the historical data to the promotional forecasting computing system 104. Additionally, and/or alternatively, the data sources 102 may be the same computing device as the facility computing system 112. For example, in some variations, instead of having the facility computing system 112 provide the historical data to another entity, the facility computing system 112 may be a data source 102 that provides the historical data directly to the promotional forecasting computing system 104.

In some variations, the data sources 102 may be implemented as engines, software functions, and/or applications. In other words, the functionalities of the data sources 102 may be implemented as software instructions stored in storage (e.g., memory) and executed by one or more processors.

The promotional forecasting computing system 104 is a computing system that is associated with the enterprise organization. The enterprise organization may be any type of corporation, company, organization, and/or other institution. In some instances, the enterprise organization may own, operate, and/or be otherwise associated with one or more retail facilities (e.g., storefronts) and/or distribution centers. For instance, the enterprise organization may operate physical storefronts that sell a plurality of products (e.g., toothbrush, toothpaste, and so on). Additionally, and/or alternatively, the enterprise organization may be associated with a medical provider and/or insurance provider. For example, the enterprise organization may receive pharmaceutical prescriptions from a medical provider, and may provide medications indicated by the prescriptions to consumers. In other words, the enterprise organization may be a pharmacy that sells physical products and/or provides prescriptions to consumers.

The enterprise organization may further run one or more marketing promotions for their products that in some instances, may be unique to a particular storefront or a group of storefronts. For instance, for a particular product (e.g., toothpaste), the enterprise organization may run a marketing promotion for buy one get one free or buy one get the second one half off. The marketing promotion may be for a particular storefront or for a group of storefront (e.g., storefronts within a certain zip code or city). Consumers typically buy more of the product during the promotion, which leads to a higher demand.

As such, the promotional forecasting computing system 104 may train a plurality of promotional forecasting ML-AI models to forecast the demand of the product during the promotional period. For instance, using a trained promotional forecasting ML-AI model, the promotional forecasting computing system 104 may determine that the demand for the product during the promotional period is one thousand units. Therefore, the promotional forecasting computing system 104 may provide information to a facility computing system 112 associated with the storefront and/or distribution center to ensure that enough of the product is supplied to the storefront during the promotional period.

The promotional forecasting computing system 104 may use historical data from the data sources 102 to train the plurality of promotional forecasting ML-AI models. For instance, among other information, the historical data may include previous sales for products at a particular store and/or previous sales during previous promotional periods for the products. Using the historical data, the promotional forecasting computing system 104 may standardize the historical data, and then use the standardized historical data to train the plurality of promotional forecasting ML-AI models. The standardization and training of the promotional forecasting ML-AI models will be described in further detail below.

In some examples, during the standardization process, the promotional forecasting computing system 104 may place products together in a cluster or a segment. For example, certain products having similar characteristics may be grouped together (e.g., toothpaste and toothbrushes may be grouped together). Additionally, and/or alternatively, each product may be associated with one or more stock keeping units (SKU). For instance, toothpaste may come by itself, in a pack of two, or in a pack of four. Each of these may be a different SKU of toothpaste. Also, different brands of toothpaste may have different SKUs. The promotional forecasting computing system 104 may group the SKUs of the product together in a cluster or segment by themselves or with other products (e.g., SKUs for other products).

In some variations, the promotional forecasting computing system 104 may train a separate promotional forecasting ML-AI model for each of the different segments. For instance, the promotional forecasting computing system 104 may train a first promotional forecasting ML-AI model for the SKUs of toothpaste and SKUs of toothbrushes, and may train a second promotional forecasting ML-AI model for SKUs of milk and SKUs of coffee. Additionally, and/or alternatively, the promotional forecasting computing system 104 may further train different promotional forecasting ML-AI model for different storefronts. For example, regarding the SKUs of toothpaste and toothbrushes, the promotional forecasting computing system 104 may train a third promotional forecasting ML-AI model for SKUs of toothpaste and toothbrushes for one or more first storefronts (e.g., a single storefront or multiple storefronts) and a fourth promotional forecasting ML-AI model for SKUs of toothpaste and toothbrushes for one or more second storefronts (e.g., a single storefront or multiple storefronts). Therefore, in some examples, the promotional forecasting computing system 104 may train a plurality of promotional forecasting ML-AI models for the different segments of products and for the plurality of storefronts (e.g., each promotional forecasting ML-AI model may be associated with a particular segment of products and one or more storefronts).

The promotional forecasting computing system 104 includes one or more computing devices, computing platforms, cloud computing platforms, systems, servers, and/or other apparatuses capable of performing tasks, functions, and/or other actions for the enterprise organization. For instance, the promotional forecasting computing system 104 may include a training system that is configured to train the plurality of promotional forecasting ML-AI models. Afterwards, the promotional forecasting computing system 104 may include a database (e.g., memory) that stores the trained promotional forecasting ML-AI models 108. The promotional forecasting computing system 104 may further include a forecasting system (e.g., a forecasting processor) that is configured to use the trained promotional forecasting ML-AI models 108 to forecast demand of promotional products (e.g., products identified in new marketing promotions). In some variations, the promotional forecasting computing system 104 and/or aspects of the promotional forecasting computing system 104 may be implemented as engines, software functions, and/or applications. In other words, functionalities of the promotional forecasting computing system 104 may be implemented as software instructions stored in storage (e.g., memory) and executed by one or more processors.

The plurality of facilities 110 may be owned, operated, and/or otherwise associated with the enterprise organization. For instance, the enterprise organization may own and/or operate physical storefronts that sell products to consumers. The facilities 110 may be and/or include these physical storefronts. Additionally, and/or alternatively, the enterprise organization may own and/or be associated with distribution centers that store the products. Additionally, and/or alternatively, the enterprise organization may own and/or operate purchasing centers that purchase products for the enterprise organization. For instance, after the products are manufactured, they may be provided to distribution centers. The distribution centers may store the products, and distribute them to the storefronts. For example, logistically, the enterprise organization may seek to ensure that the products are in stock at each of their storefronts, but the demand of the products may vary based on geographical location, seasonality of the products (e.g., consumers may seek to purchase more of certain products during the holiday season), and/or other reasons. Therefore, a facility computing system 112 at a storefront may obtain data associated with the products themselves for the particular storefront. For example, the facility computing system 112 may automatically track the amount of a particular product being sold during a time period, including products sold during one or more promotional periods. Additionally, and/or alternatively, the facility computing system 112 may receive user input indicating the amount of the product being sold during the time period. Afterwards, the facility computing system 112 may provide this information and/or other information to the data sources 102 and/or to the promotional forecasting computing system 104. Each of the facility computing systems 112 may provide this information.

Additionally, and/or alternatively, the facility computing systems 112 may receive information from the promotional forecasting computing system 104. For example, after using the trained promotional forecasting ML-AI models 108 to forecast demand of one or more products for one or more new marketing promotions, the facility computing systems 112 may receive information indicating the demand. For instance, the marketing promotion may be for eight weeks in the future or twelve weeks in the future, and may indicate the forecasted demand to be one thousand units. The facility computing system 112 may receive and display this information to an operator at the storefront, at the distribution center, or at another facility 110 such as at a purchasing center. Using this information, the enterprise organization may ensure that they are stocked up on enough of the product during the promotional period (e.g., the period of time that the marketing promotion is running at the storefront). Additionally, and/or alternatively, the facility computing system 112 may provide instructions (e.g., purchasing instructions) to order the product and ensure delivery of the product to the physical storefronts prior to and/or during the promotional period. For instance, the facility computing system 112 may be at a purchasing center handles the logistics for the enterprise organization. Based on the information from the promotional forecasting computing system 104, the facility computing system 112 may purchase products so that they arrive at the distribution center and/or storefronts with sufficient time to ensure that the storefronts are stocked during the promotional period.

The facility computing system 112 may be and/or include, but is not limited to, a desktop, laptop, tablet, mobile device (e.g., smartphone device, or other mobile device), smart watch, an internet of things (IOT) device, or any other type of computing device that generally comprises one or more communication components, one or more processing components, and one or more memory components. The facility computing system 112 may be able to execute software applications managed by, in communication with, and/or otherwise associated with the enterprise organization. Additionally, and/or alternatively, the facility computing system 112 may be configured to perform other functions.

It will be appreciated that the exemplary environment depicted in FIG. 1 is merely an example, and that the principles discussed herein may also be applicable to other situations—for example, including other types of institutions, organizations, devices, systems, and network configurations. As will be described herein, the environment 100 may be used by health care and/or retail enterprise organizations. However, in other instances, the environment 100 may be used by other types of enterprise organizations such as financial institutions or insurance institutions.

Figure 2:
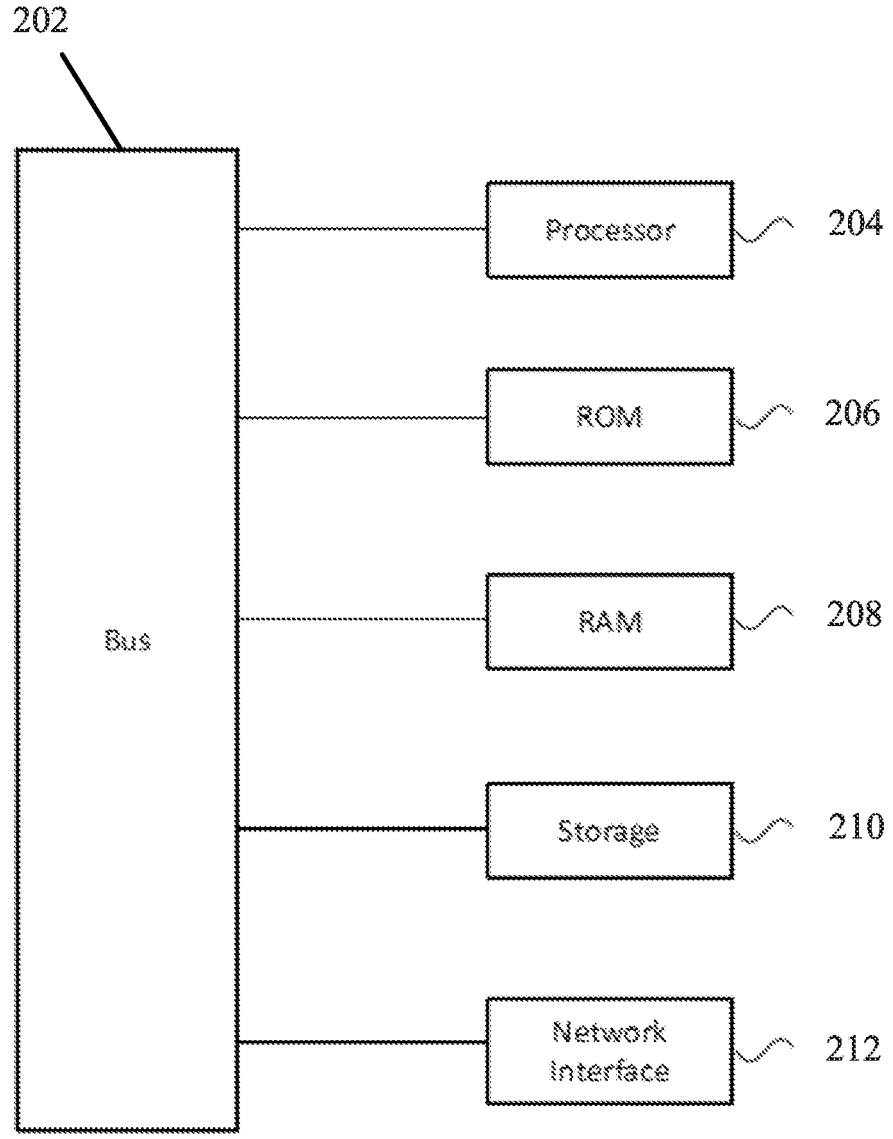
FIG. 2 is a simplified block diagram of one or more devices or systems within the exemplary environment of FIG. 1.

FIG. 2 is a block diagram of an exemplary system and/or device 200 within the environment 100. The device/system 200 includes a processor 204, such as a central processing unit (CPU), controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component within the device/system 200.

FIG. 3 is an exemplary process for using the promotional forecasting ML-AI model to forecast promotional products in accordance with one or more examples of the present application. The process 300 may be performed by the promotional forecasting computing system 104 shown in FIG. 1. However, it will be recognized that any of the following blocks may be performed in any suitable order, the blocks may be performed by any suitable system, and that the process 300 may be performed in any suitable environment. The descriptions, illustrations, and processes of FIG. 3 are merely exemplary and the process 300 may use other descriptions, illustrations, and processes.

At block 302, the promotional forecasting computing system 104 obtains (e.g., receives) marketing information indicating a marketing promotion for a particular product. For example, the enterprise organization may seek to run a marketing promotion for a product at one or more of their storefronts (e.g., buy one toothpaste, get one free). The promotional forecasting computing system 104 may receive marketing information indicating the new marketing promotion. For instance, the marketing information may indicate the type of promotion, the promotion strategy, the start/end date of the promotion, the product and/or SKU information for the promotion (e.g., the promotion may be only for one SKU of toothpaste or may be for every SKU of the toothpaste), the storefront(s) indicated by the promotion (e.g., the storefronts that will be running the promotion), and/or additional information.

As mentioned previously, the enterprise organization may have numerous storefronts across different geographical areas that each sell numerous products. The enterprise organization may further seek to run multiple different marketing promotions at once. In some instances, as part of the business strategy, the enterprise organization may seek to have millions (e.g., fifty million) of promotions each week, with each promotion indicating a particular storefront/product combination (e.g., each promotion identifies a particular product at a particular storefront). To account and more accurately predict the demand for the products at the center of each of these promotions, the promotional forecasting computing system 104 may use one or more ML-AI models to forecast the demand for these numerous products during their promotional periods.

At block 304, the promotional forecasting computing system 104 determines, based on the particular product, a first product segment from a plurality of product segments. Each of the plurality of product segments comprises a set of products (e.g., one or more products) that are clustered together. For example, products may be clustered together based on the similarity of the products themselves and/or other factors. For example, the promotional forecasting computing system 104 may segment and/or cluster the products into a plurality of product segments. For instance, the promotional forecasting computing system 104 may use one or more algorithms or processes (e.g., a dynamic time warping (DTW) or embedding process) to cluster similar products and/or similar SKUs of products together. For example, a first product segment may include a set of products (e.g., toothpaste and toothbrushes) and a second product segment may include another set of products (e.g., milk and coffee). Additionally, and/or alternatively, a product segment may include different brands of the products that are clustered together. Additionally, and/or alternatively, a product segment may include different SKUs of the product together. In some instances, a product segment may only include a single type of product, which may include all of the SKUs for the product. In other instances, the product segment may include multiple different types and their SKUs.

After determining the segments of the product, the promotional forecasting computing system 104 may store indicators of the segments within memory and/or a database. Then, at block 304, the promotional forecasting computing system 104 may compare the indicators with the particular product associated with the new marketing promotion to determine which product segment the particular product belongs to. The promotional forecasting computing system 104 may select this product segment (e.g., the first product segment).

At block 306, the promotional forecasting computing system 104 determines one or more promotional forecasting ML-AI models from a plurality of promotional forecasting ML-AI models to use for the new marketing promotion based on the first product segment. Each of the plurality of promotional forecasting ML-AI models may be associated with a product segment from the plurality of product segments. For example, as will be explained below, the promotional forecasting computing system 104 may train a plurality of promotional forecasting ML-AI models. The plurality of promotional forecasting ML-AI models may each be associated with a particular product segment (e.g., a group of products). Additionally, and/or alternatively, the plurality of promotional forecasting ML-AI models may be each associated with one or more storefronts. For example, the promotional forecasting computing system 104 may train each promotional forecasting ML-AI model using training data for a particular product segment and/or for a particular set of storefronts.

After training, at block 306, the promotional forecasting computing system 104 may determine (e.g., select) the promotional forecasting ML-AI model associated with the particular product segment and/or associated with the particular storefront(s). For example, based on the product segment of the particular product identified by the marketing promotion and/or the storefront(s) identified by the marketing promotion, the promotional forecasting computing system 104 may select the promotional forecasting ML-AI model for the particular product segment and/or for the storefront(s). In some instances, the marketing promotion may be for a single storefront and the promotional forecasting computing system 104 may select a single promotional forecasting ML-AI model (e.g., the model for the particular product segment and for the single storefront). In other instances, the marketing promotion may be for multiple storefronts and the promotional forecasting computing system 104 may select multiple promotional forecasting ML-AI models (e.g., a first ML-AI model for the product segment and for one or more first storefronts and a second ML-AI model for the product segment and for one or more second storefronts).

At block 308, the promotional forecasting computing system 104 inputs promotional information associated with the new marketing promotion into the one or more promotional forecasting ML-AI models to forecast amounts of the particular product to provide to one or more storefronts. For example, after determining the promotional forecasting ML-AI model(s) to use for the marketing promotion at block 306, the promotional forecasting computing system 104 inputs the promotional information into the determined ML-AI model(s) to generate output information. The output information may indicate forecasted amounts of the product to provide to the storefronts for the new marketing promotion. For instance, the promotional forecasting computing system 104 may determine two ML-AI models for two different sets of storefronts. The promotional forecasting computing system 104 may input the promotional information into the two ML-AI models to generate output information for the two different sets of storefronts. The output information may indicate to provide one thousand units of the product (e.g., the SKU of the product) to the first storefront and one thousand two hundred units of the product to the second storefront.

In some instances, the promotional information may be the same as the marketing information. In other instances, the promotional forecasting computing system 104 may convert the marketing information into the promotional information. For example, certain parts of the marketing information might not be used to generate the output information from the ML-AI models. In such examples, the promotional forecasting computing system 104 may remove this information from the marketing information, and the remaining information may be the promotional information.

At block 310, the promotional forecasting computing system 104 provides product information indicating the amount of the particular product to one or more facility computing systems associated with the one or more storefronts. For example, as mentioned above, after determining the amount of product to provide for the new marketing promotion, the promotional forecasting computing system 104 may provide information (e.g., product information)

indicating this amount to one or more facility computing systems 112. For instance, the promotional forecasting computing system 104 may provide this information to one or more facility computing systems 112 associated with the storefront and/or distribution center. Then, the facility computing systems 112 may use this information to ensure that the product for the new marketing promotion is stocked during the promotional period. Additionally, and/or alternatively, the facility computing system 112 may be associated with a purchasing center. The facility computing system 112 may order the product (e.g., from a manufacturing facility) and have it delivered to the storefront and/or distribution center so that the product is in stock during the promotional period.

The promotional forecasting computing system 104 may perform process 300 for numerous different marketing promotions daily, weekly, monthly, or any other periodic duration. For example, the enterprise organization may create new marketing promotions each week (e.g., fifty million marketing promotions for different storefront-product combinations). The promotional forecasting computing system 104 may perform process 300 for each of the new marketing promotions, and then provide product information to the different facility computing systems 112 associated with the storefronts to ensure that the product is stocked during the numerous marketing promotions. In some variations, the marketing promotions may be set for a certain time in the future (e.g., eight weeks in the future). Therefore, the promotional forecasting computing system 104 may provide the product information to the facility computing systems 112 earlier than when the promotional period begins to ensure that the product is stocked during the promotional period (e.g., eight weeks in the future).

In some examples, the storefront and/or the product may be a new product or new storefront. In such examples, at block 304 and 306, the promotional forecasting computing system 104 may determine the first product segment and/or the promotional forecasting ML-AI model to use based on similar products and/or storefronts. For example, the new product may be a new SKU of a previous product. The promotional forecasting computing system 104 may determine the first product segment based on the other SKUs of the product (e.g., the product segment that the other SKUs of the product belong to). In other examples, the entire storefront may be a new storefront. The promotional forecasting computing system 104 may use a promotional forecasting ML-AI model associated with a storefront that has similar characteristics to the new storefront (e.g., similar geographical region, similar size of the storefront, and/or other characteristics) for the promotional forecasting.

In some variations, one or more blocks of process 300 may be optional. For instance, in some instances, the promotional forecasting ML-AI models may be associated with one or more product segments and/or one or more storefronts. For example, block 304 may be optional and a single promotional forecasting ML-AI model may be used to forecast the promotional demand of products. Additionally, and/or alternatively, each promotional forecasting ML-AI model may be used for multiple different product segments. Additionally, and/or alternatively, each promotional forecasting ML-AI model may be used for and/or associated with a single storefront or multiple storefronts (e.g., two or more storefronts). Additionally, and/or alternatively, each promotional forecasting ML-AI model may be used for a particular product. For instance, each promotional forecasting ML-AI model may be associated with a singular product and/or a singular SKU.

FIG. 4 is another exemplary process using the promotional forecasting ML-AI model to forecast promotional products in accordance with one or more examples of the present application. FIG. 5 is yet another exemplary process using the promotional forecasting ML-AI model to forecast promotional products in accordance with one or more examples of the present application. For instance, the promotional forecasting computing system 104 uses process 400 of FIG. 4 to train the promotional forecasting ML-AI models. Process 500 of FIG. 5 describes one or more blocks of process 400 in more detail. The processes 400 and 500 may be performed by the promotional forecasting computing system 104 shown in FIG. 1. However, it will be recognized that any of the following blocks may be performed in any suitable order and that the processes may be performed in any suitable environment. The descriptions, illustrations, and processes of FIGS. 4 and 5 are merely exemplary and the processes may use other descriptions, illustrations, and processes.

At block 402, the promotional forecasting computing system 104 obtains, from a plurality of data sources (e.g., data sources 102 and/or the facility computing systems 112) historical data for a plurality of products. The historical data indicates previous marketing promotions for the plurality of products. For instance, the historical data may indicate sales information, information associated with previous marketing promotions, storefront information, and/or other information associated with forecasting demand for marketing promotions. For example, as mentioned previously, the data sources 102 and/or the facility computing systems 112 may obtain historical information indicating previous sales of products and/or previous sales of the products during a promotional period. For instance, the data sources 102 may obtain historical data indicating that previously, a buy one get one free promotion for toothpaste had total sales of five hundred units. The data sources 102 may provide this information to the promotional forecasting computing system 104. The promotional forecasting computing system 104 may receive the historical data for a plurality of products and for a plurality of different storefronts. For instance, certain storefronts in a large city may sell more of a product (e.g., toothpaste) than certain other storefronts in a rural area.

The historical data may include any information associated with the product, the storefront, and/or marketing promotions. For instance, in some examples, the historical data may include, but is not limited to, sales history, storefront-level attributes, SKU-level attributes, previous promotional offers, and/or other information. Additionally, and/or alternatively, the historical data may indicate external events such as natural disasters, elections, policy changes, school schedules, hosted events at the venue (e.g., large gatherings and/or conferences), and/or other types of external events.

In some variations, the data sources 102 and/or the facility computing systems 112 may generate a table or array (e.g., a promotion allocation table) for the historical data and/or a part of the historical data, and then provide the table or array to the promotional forecasting computing system 104. The historical data table or array may indicate the products, the storefronts, the offer times, the promotional data, the promotion period, and/or the promotion duration. In some instances, the historical data may indicate whether the promotion was seasonal, associated with a holiday, and/or other types of promotions that are unique to a certain time period during the calendar year. Additionally, and/or alternatively, the historical data may indicate the geographical area that the previous promotion occurred (e.g., whether it was on the mainland of the United States or in Hawaii), the type of storefront that offered the promotion (e.g., whether the promotion was at a larger storefront or smaller storefront), the product(s)/inventory that was associated with the promotion, the duration of the promotion, the type of promotion (e.g., buy one get one free or buy two get one half off), and so on.

In some examples, the historical data may indicate and/or include store attributes for the plurality of storefronts associated with the enterprise organization. For instance, the store attributes may indicate a location of the store, demographic information of the store (e.g., information of the consumers that shop at the store), financial information of the storefront and/or the consumers shopping at the storefront (e.g., the average salary of individuals that shop at the storefront), and/or other information associated with the storefront.

In some instances, the historical data may include and/or indicate start and end dates of the promotional event, advertisement date of the promotion, promotion type, promotion strategy, SKUs of product(s) offered by the promotion, brand of the product, dates the product/SKUs were offered, price point of the product, velocity value of the product (e.g., how fast the product was sold), median average and/or number of people that live nearby to the storefront, margin value of the product/SKU, and/or other information.

In some variations, the historical data may be updated periodically (e.g., weekly or daily). For example, the promotional forecasting computing system 104 may obtain new historical data for a plurality of products every day or every week. The promotional forecasting computing system 104 may update the historical data based on the new historical data. For instance, the new historical data may be sales for the previous week. The promotional forecasting computing system 104 may use historical data for a rolling window/ period of time such as two years, three years, five years, and/or other durations of time. Therefore, the promotional forecasting computing system 104 may remove the oldest historical data (e.g., the weekly historical data from two years ago) to include the new historical data for the previous week.

At block 404, the promotional forecasting computing system 104 standardizes the historical data using a plurality of standardization processors (e.g., engines and/or hardware processors) to generate standardized historical data. For instance, the promotional forecasting computing system 104 may perform one or more standardization processes such as one or more calculations, computations, determinations, and/or processing techniques to generate the standardized historical data, which is used to train the plurality of promotional forecasting ML-AI models.

For example, in some instances, the promotional forecasting computing system 104 may determine (e.g., calculate) lagging data such as lagged average sales. For instance, the promotional forecasting computing system 104 may determine lagged average sales by shifting the sales by a week and/or determining an average of the lagged sales. For instance, a lag of one week may indicate for the promotional forecasting computing system 104 to shift the week 2 sales (e.g., 20 units) to week 3. Additionally, and/or alternatively, the promotional forecasting computing system 104 may determine lagged minimum or maximum saves, direct lag sales features, and/or other lagging data. The promotional forecasting computing system 104 may use the lagging data to train the promotional forecasting ML-AI models, which will be described in further detail below.

Additionally, and/or alternatively, the promotional forecasting computing system 104 uses one or more algorithms or processes (e.g., NLPs) to standardize the historical data. For instance, the promotional forecasting computing system 104 may use natural language processing (NLP) techniques or other types of processing algorithms including types of ML-AI models to create new features from historical data. For example, the promotional forecasting computing system 104 may use NLP techniques to convert the external events (e.g., natural disasters or policy changes) into a feature embedding (e.g., a format which can be an input to tabular data). Subsequently, the promotional forecasting computing system 104 may use the embedding for the external events to train the promotional forecasting ML-AI models.

Additionally, and/or alternatively, the promotional forecasting computing system 104 uses one or more standardization processors to generate the standardized historical data. The standardization processors are described in further detail in FIG. 5. For instance, referring to FIG. 5, process 500 describes block 404 in more detail.

At block 502, the promotional forecasting computing system 104 uses a feature creation layer processor (e.g., engine) to determine a plurality of features for the historical data. The features are used to train the promotional forecasting ML-AI models. For instance, the features may be associated with the different promotions, product data associated with the different products, store attributes, and/or other information. In some instances, the promotional forecasting computing system 104 may generate a table or array for the features. For example, the table or array may indicate the features and the time information. For instance, each feature may be associated with an individual column and each time period (e.g., each week) may be associated with an individual row. At block 502, the promotional forecasting computing system 104 may determine the features that are used and populate the table based on the historical data. For instance, the promotional forecasting computing system 104 may determine a plurality of features (e.g., automatically and/or based on user input indicating the features to be used to train the ML-AI models). Afterwards, based on the historical data, the promotional forecasting computing system 104 may populate the table. The finalized table may be the standardized historical data that is used to train the promotional forecasting ML-AI models.

For instance, in some examples, certain portions of the historical data may be directly inserted into the table. For example, the promotional forecasting computing system 104 may populate the sales information, promotional information, storefront information, and/or other information directly into the table. Furthermore, the promotional forecasting computing system 104 may populate the calculated lagging data directly into the table. Therefore, the sales, average sales, lagging sales, advertisement, type, promotional count, and so on may be directly input into the table.

The features may include, but are not limited to, promotional count (e.g., number of promotions for a particular storefront and/or how many times the same promotion for the product has been offered in the previous time period such as the past two years), different types of promotions for the products, number of times that the product was not sold at the regular price, all of the promotions offered for the product, product and store combinations for the promotions, margin rate of the products (e.g., the profit associated with the product), history and/or frequency of the promotion previously (e.g., how long back in time was the promotion given and the number of times the promotion was given), and so on. Additionally, and/or alternatively, the features may further include categories of the historical data described above and/or additional data that is based on the historical data. For instance, the features may include moving average of sales, exponential moving average of sales, minimum and maximum sales, lags from the minimum, maximum, and moving average of sales, direct lag from target variables, and/or exogenous features (e.g., seasonal features, promotion features, unit price, and so on).

In some examples, as mentioned above, the promotional forecasting computing system 104 may use one or more algorithms or processes such as NLP techniques to determine the features. For instance, the promotional forecasting computing system 104 may use NLP techniques to convert the external events (e.g., natural disasters or policy changes) into the feature embedding.

FIGS. 6A and 6B show exemplary arrays for the standardized historical data to be used for training the promotional forecasting ML-AI models in accordance with one or more examples of the present application. For example, referring to FIG. 6A, an example array (e.g., table) 600 shows the features in the top row and the time information (e.g., weeks) in the left-most column. At block 502, the promotional forecasting computing system 104 may populate the entries from the array 600 based on the historical information. Furthermore, as shown in array 600, each of the rows is further associated with a SKU. For instance, the promotional forecasting computing system 104 may further populate entries of the array for particular SKUs. As such, for a certain SKU (e.g., a four pack of toothpaste), the promotional forecasting computing system 104 may populate the feature information (e.g., sales data, previous promotion counts, and so on) for that particular SKU for each week. While only 18 weeks and ten features are shown in array 600, the promotional forecasting computing system 104 may include any number of features and any number of weeks (e.g., 104 weeks for the past two years and hundreds of different features). Furthermore, the promotional forecasting computing system 104 may generate a single array for multiple different SKUs and/or products or different arrays for each of the different SKUs and/or products. Additionally, and/or alternatively, the promotional forecasting computing system 104 may generate numerous arrays (e.g., two hundred thousand arrays) for the different SKUs (e.g., the two hundred thousand SKUs). Additionally, and/or alternatively, as mentioned above, the promotional forecasting computing system 104 may update the arrays as new historical data is obtained from the data sources 102 and/or the facility computing systems 112 (e.g., updated weekly).

At block 504, the promotional forecasting computing system 104 uses a lost sale layer processor (e.g., engine) to update lost sales indicated by the historical data (e.g., based on supply shortages). For example, certain products may be out of stock for a period of time (e.g., either due to demand or due to supply chain issues). Therefore, the sales information for the product might not be accurate as the true demand for the product might not be known solely from the historical data. At block 504, the promotional forecasting computing system 104 may determine whether the sales data for the product for certain weeks is inaccurate (e.g., due to too much demand or due to supply chain issues), and modify the sales data to account for the product being out of stock. For instance, in some examples, supply chain inefficiencies (e.g., during the COVID-19 pandemic) may cause a product to be out of stock. The promotional forecasting computing system 104 may receive an indicator that the product was out of the stock for a given period (e.g., from a supplier, from the storefront or distribution center, or from another entity indicating that the product was out of stock). The promotional forecasting computing system 104 may correct the sales data (e.g., one or more weeks of the sales data impacted by the out of stock product) by calculating new sales data for the impacted period. Then, the promotional forecasting computing system 104 may then update the array (e.g., array 600) such as by replacing the previous sales data for the product/SKU of the product with the new sales data.

In some variations, the promotional forecasting computing system 104 may determine the new sales data based on sales from a product or group of products (e.g., a cluster of products) that are similar to the product with the lost sales. For example, the promotional forecasting computing system 104 may determine a product or groups of products (e.g., a cluster of products) that have similar characteristics to the product with the lost sales (e.g., both are toiletry items). Then, the promotional forecasting computing system 104 may calculate new sales data based on the sales data associated with the similar product or cluster of products. For instance, the new sales data may be the sales data for the product, an average of sales data for the cluster of products, and/or an exponential moving average of the sales data for the cluster of products. The promotional forecasting computing system 104 may then update the array (e.g., array 600) such as by replacing the previous sales data for the product/SKU of the product with the new sales data. In some instances, the new sales data may be based on times or weeks when the product (e.g., the SKU of the product and/or the SKU-store combination for the product) was not out of stock.

In some examples, the promotional forecasting computing system 104 may determine the new sales data based on the previous sales data for the product. For example, the historical data may include the previous two years of sales data for the product. Based on the historical data, the promotional forecasting computing system 104 may determine the new sales data. For instance, the new sales data may be the average weekly sales data or the sales data for another week that had promotion (e.g., the sales data for week 4 may be inaccurate due to lost sales and the promotional forecasting computing system 104 may use the sales data for week 3 or week 6 instead). Additionally, and/or alternatively, the promotional forecasting computing system 104 may use a moving average and/or an exponentially weighted moving average to determine the lost sales data for the particular week based on the previous sales data for the product when the product was in stock.

In some variations, the promotional forecasting computing system 104 may use the sales data throughout the time period included in the historical data (e.g., the sales data for the product for the past two years) to determine whether one or more weeks indicate lost sales. For instance, one week of sales may be significantly lower than the average weekly sales of the product. Additionally, and/or alternatively, the historical data may include an indicator indicating that the product went out of stock during one or more weeks.

In some instances, the promotional forecasting computing system 104 may tag certain weeks that do not represent the true demand of the product. For instance, referring to FIG. 6A, one or more of the entries for sales data for the SKU of the product (e.g., one or more weeks of SKU sales data) may be inaccurate. The promotional forecasting computing system 104 may replace these entries with new sales data. For instance, the promotional forecasting computing system 104 may determine an average, moving average, and/or exponentially weighted moving average of the sales data for the product to use for the new sales data. Additionally, and/or alternatively, the entries may indicate lost sales data associated with a promotional period (e.g., a promotion was offered during that week, which caused the product to be out of stock). The promotional forecasting computing system 104 may use sales data from other week(s) that also had a promotional period for the product to determine new sales data. For instance, the promotional forecasting computing system 104 may average the sales data from the other weeks with promotions for the product, and use the averaged sales data for the new sales data. For example, if week 6 is the week that indicates lost sales, then the promotional forecasting computing system 104 may determine a moving average of the two previous weeks that had a promotion (e.g., weeks 1 and 2) and the next two weeks (e.g., weeks 8 and 9) that had a promotion, and use the determined moving average as the new sales data.

In some examples, the promotional forecasting computing system 104 may use clusters of products or SKUs that are similar to the product to determine the new sales data. For instance, the promotional forecasting computing system 104 may determine a similar product/SKU within the cluster of products that had the same promotion or had a similar promotion running. For example, week 6 of the product had a promotion for buy one get one free, which caused the product to be out of stock. The promotional forecasting computing system 104 may determine a similar SKU to the product that also had a buy one get one free promotion and that was in stock throughout the entire week. For instance, week 8 for a different SKU of the product may have had the same promotion and was in stock throughout. The promotional forecasting computing system 104 may use the sales data for week 8 as the new sales data. Additionally, and/or alternatively, the same promotion may have been offered for multiple weeks. The promotional forecasting computing system 104 may use an average of sales data for those weeks as the new sales data.

In some variations, block 504 and block 506, which is described below, may be performed in reverse. For example, the promotional forecasting computing system 104 may first use a segmentation layer processor to segment and cluster the plurality of products. For instance, based on the segmentation, the promotional forecasting computing system 104 may determine a plurality of product segments. Then, the promotional forecasting computing system 104 may use the product segments to determine the clusters of products and/or SKUs to use for determining the lost sales data (e.g., replacing the lost sales data with the new sales data based on the clusters of products and/or SKUs identified by the product segment) as described above.

At block 506, the promotional forecasting computing system 104 uses a segmentation layer processor (e.g., engine) to segment and cluster the plurality of products indicated by the historical data (e.g., the historical sales data). For example, as mentioned above, the promotional forecasting computing system 104 may cluster products together into a plurality of product segments. For instance, SKUs of toothpaste may be clustered together into a product segment. The size of the product segments that are created may be capped to a specific value. By keeping the number of records or entries within each product segment to be within the specific value (e.g., seven million records), this may ensure that the segments created are substantially uniform in size, which may further enhance performance, reduce dimensionality, and reduce forecasting errors while still maintaining accuracy.

In some examples, the promotional forecasting computing system 104 may use Dynamic Time Warping (DTW) to create the product segments. For instance, the promotional forecasting computing system 104 may use DTW to generate graphs for the products based on the historical data. For example, the promotional forecasting computing system 104 may determine data points for the products and graph the data points. Then, the promotional forecasting computing system 104 may determine distances between data points to segment or cluster the products together into sub-groups and/or product segments. In some instances, the promotional forecasting computing system 104 may generate data points for each SKU of the products. Using these data points, the promotional forecasting computing system 104 may determine distances between them and determine product segments based on the distances. In other words, using DTW, the promotional forecasting computing system 104 may compute minimum distances between the sales trajectories for two products and/or two SKUs by time warping (e.g., aligning them to match each point in the first series to one or many points in the other). Based on the computed distances, the promotional forecasting computing system 104 may determine the products/SKUs that belong to each of the product segments.

Additionally, and/or alternatively, the promotional forecasting computing system 104 may use DTW to generate sub-groups, and then the promotional forecasting computing system 104 may further use one or more rules (e.g., business rules such as sales and velocity for the products and/or random sampling) to determine the product segments from the sub-groups. For example, using DTW within categories of products, the promotional forecasting computing system 104 may determine sub-groups of products within them. Then, based on business rules, the promotional forecasting computing system 104 may sub-divide the groups that are over a threshold data size (e.g., a data size associated with seven million product-storefront combinations) to determine the product segments. Each product-storefront combination may be a product (e.g., a SKU of a product) that is sold at a storefront. After, the promotional forecasting computing system 104 may perform random sampling on any group that has more than seven million combinations to reduce them to be below seven million combinations. Once they are below seven million combinations, the promotional forecasting computing system 104 may assign the group as a product segment. Further, for any groups that are less than one hundred thousand product-store combinations, the promotional forecasting computing system 104 may group them together with other groups that are less than one hundred thousand product-store combinations. After grouping them together, the promotional forecasting computing system 104 may assign these as product segments.

At block 508, the promotional forecasting computing system 104 uses a new product and new storefront layer processor (e.g., engine) to generate new product or new storefront data for demand forecasting. For example, the promotional forecasting computing system 104 may generate new product or new storefront data based on: (1) either the product is new to a particular storefront or the storefront is new, (2) the storefront is new to the chain, (3) or the product or storefront are not completely new, but they did not have any or enough sales during the duration of the training data (e.g., the last two years). For example, the promotional forecasting computing system 104 may generate new product or new storefront data for product/storefront combinations that were introduced less than 13 weeks ago. In some examples, the promotional forecasting computing system 104 may generate data (e.g., the data for the different features) and populate the arrays such as array 600. As the enterprise organization does not have previous sales data or other historical data for this new product or new SKU, the promotional forecasting computing system 104 computes a forecast for the new storefront/SKU combinations by clustering similar products and stores together based on static attributes such as product type and form, store demography, and geography, etc. Then, the promotional forecasting computing system 104 may populate the forecast for a new product with the median forecast generated by a cluster of products most similar to the new product. In some variations, the enterprise organization may seek to open a new storefront. As the enterprise organization does not have previous sales data or other historical data for this new storefront, the promotional forecasting computing system 104 may generate new storefront data by computing demand forecast by taking the median forecast generated over a cluster of stores most similar to the new store.

In some instances, the promotional forecasting computing system 104 may use one or more algorithms (e.g., a k-medoids algorithm) to determine the new product data and/or the new storefront data. For instance, the promotional forecasting computing system 104 may use the k-medoids algorithm to determine clusters of similar products to the new product (e.g., eight clusters or categories). Then, based on determining the clusters, the promotional forecasting computing system 104 may determine one or more similar products and/or SKUs to the new product, and use the historical data for the similar products and/or SKUs as the new product data. Additionally, and/or alternatively, the promotional forecasting computing system 104 may use the k-medoids algorithm to determine clusters of similar storefronts to the new storefront (e.g., twenty-five clusters or categories). Then, based on determining the clusters, the promotional forecasting computing system 104 may determine one or more similar storefronts to the new storefront, and use the historical data for the similar storefronts as the new storefront data.

Afterwards, returning to FIG. 4, at block 406, the promotional forecasting computing system 104 trains the plurality of promotional forecasting ML-AI models using the standardized historical data. As mentioned above in FIG. 5, the standardized historical data may be based on the historical data, the lost sales data, the different product segments, and/or the new product and/or new storefront data. The promotional forecasting ML-AI models may be any type of ML-AI models including supervised, unsupervised, and/or deep learning ML-AI models. In some examples, the promotional forecasting ML-AI models may be supervised ML-AI models such as light gradient-boosting machine (LightGBM) models.

In some variations, the promotional forecasting computing system 104 may use the standardized historical data at a SKU-week level to train the promotional forecasting ML-AI models. For instance, the promotional forecasting computing system 104 may use the array 600 shown on FIG. 6A to train the promotional forecasting ML-AI models. In other variations, and referring to FIG. 6B, the promotional forecasting computing system 104 may further group standardized historical data based on product segments. For example, as shown in array 610, the promotional forecasting computing system 104 may group the data for each SKU into the product segments that were determined at block 506. For instance, as mentioned previously, a product segment may include multiple SKUs for a particular product such as toothpaste. Additionally, and/or alternatively, the product segment may include multiple SKUs for a first product and multiple SKUs for a second product. Based on the product segment that the SKU belongs to, the promotional forecasting computing system 104 may group the standardized historical data for the SKU together with standardized historical data for the other SKUs and/or products from the same product segment to populate the array 610. Afterwards, the promotional forecasting computing system 104 may train the promotional forecasting ML-AI models based on the standardized historical data for the entire product segment. As such, as mentioned above in block 306, each promotional forecasting ML-AI model may be associated with a particular product segment.

Additionally, and/or alternatively, each promotional forecasting ML-AI model may be further associated with a particular set of storefronts (e.g., one or more storefronts). For example, referring to array 600, the SKU-week information may be associated with a particular storefront. Then, the promotional forecasting computing system 104 may group this information with other SKUs and/or products within the same product segment at the same storefront. Following, the promotional forecasting computing system 104 may train a promotional forecasting ML-AI model for the product segment and the storefront. Therefore, the promotional forecasting computing system 104 may train numerous promotional forecasting ML-AI models for the same product segment, and each of these promotional forecasting ML-AI models may be for a different storefront of the enterprise organization.

In some variations, the promotional forecasting computing system 104 may split the standardized historical data into training data and test data. For instance, the promotional forecasting computing system 104 may determine a split point (e.g., at the 52 week period). Then, the promotional forecasting computing system 104 may split the standardized historical data into the training and test data based on the split point (e.g., the first 52 weeks are training data and the rest are test data). Then, the promotional forecasting computing system 104 may train the promotional forecasting ML-AI models using the training data to predict the test data as best as possible. After training the ML-AI model, the promotional forecasting computing system 104 may validate the trained model on the test data.

In some instances, the promotional forecasting computing system 104 may further use an exponential weighted moving average (EWMA) on the standardized historical data that has been grouped based on product segments. For instance, for holidays or based on the seasonality, certain sales data for products may be skewed. Therefore, the promotional forecasting computing system 104 may use EWMA on the standardized historical data to generate EWMA standardized historical data. Afterwards, the promotional forecasting computing system 104 may train the plurality of promotional forecasting ML-AI models using the EWMA standardized historical data. In some examples, for EWMA, the promotional forecasting computing system 104 may weigh recent weeks (e.g., sales data from the most recent weeks) more heavily than past weeks. Additionally, and/or alternatively, the promotional forecasting computing system 104 may use the EWMA on the standardized historical data at the SKU level (e.g., array 600). Afterwards, the promotional forecasting computing system 104 may determine the standardized historical data at the product segment level based on the EWMA standardized historical data at the SKU level. Then, the promotional forecasting computing system 104 may train the promotional forecasting ML-AI models based on the EWMA standardized historical data at the product segment level.

In some examples, the promotional forecasting computing system 104 may use the lagged data to train the promotional forecasting ML-AI models. Initially, the historical data may include data in a time series (e.g., sales data over a period of time). The promotional forecasting computing system 104 may obtain the lagged data, and use the lagged data to convert the time series data into a training dataset that is capable of training a supervised machine learning model. For instance, as shown in FIGS. 6A and 6B, the promotional forecasting computing system 104 may determine standardized historical data that includes arrays for the SKU-week-storefront combinations and/or product segment-week-storefront combinations. By determining the standardized historical data, the promotional forecasting computing system 104 converts the time series data into a data format that is capable of being used to train the supervised machine learning models (e.g., the LightGBM models).

In some variations, to train the plurality of promotional forecasting ML-AI models, the promotional forecasting computing system 104 may use one or more loss functions. For example, to ensure the plurality of promotional forecasting ML-AI models are sufficiently accurate enough, the promotional forecasting computing system 104 may use one or more loss functions to compare the output from the promotional forecasting ML-AI models with the test data. For instance, the loss function may be a standard loss function such as a least square error. For instance, the loss function may be $0.5*(y-a)^2$ with "y" being the forecasted amount (e.g., the output from the promotional forecasting ML-AI model) and "a" being the actual amount from the test data. Based on the loss function, the promotional forecasting computing system 104 may determine a confidence value and compare the confidence value with a threshold. Based on the comparison, the promotional forecasting computing system 104 may determine whether the promotional forecasting ML-AI model is sufficiently trained.

In some instances, the promotional forecasting computing system 104 may use a customized loss function to determine whether the promotional forecasting ML-AI model is sufficiently trained. For instance, the promotional forecasting computing system 104 may use a loss function that takes into account the margin contribution and/or the velocity contribution. For example, the customized loss function may be $0.5*w_1*(y-a)^2-w_2 m*y-w_3 v*y$, where "$w_1$", "$w_2$", and "$w_3$" are weights associated with the least square error, the margin contribution, and the velocity contribution, "y" is the forecasted amount, "a" is the actual amount, "m" is the margin rate for the product, and "v" is the sales velocity (e.g., total sales divided by the number of stores). In other words, instead of using a standard loss function, the promotional forecasting computing system 104 and/or the ML-AI model may use a customized loss function that considers the margin rate of the product (e.g., the profit associated with selling the product) and the velocity of the product (e.g., how fast the product is being sold) while determining a business-optimized demand forecast. In some instances, the promotional forecasting computing system 104 may determine the weights (e.g., the weights $w_1$, $w_2$, and $w_3$) using one or more algorithms and/or based on user (e.g., business) input.

At block 408, the promotional forecasting computing system 104 determines whether to retrain the plurality of promotional forecasting ML-AI models based on scoring the plurality of promotional forecasting ML-AI models. For example, the promotional forecasting computing system 104 may determine to retrain the promotional forecasting ML-AI models periodically (e.g., every three weeks). For instance, the promotional forecasting computing system 104 may determine to retrain the promotional forecasting ML-AI models after a set amount of time has elapsed (e.g., three weeks has elapsed). Additionally, and/or alternatively, referring to block 506, the promotional forecasting computing system 104 may determine to re-train and/or re-determine the segment/clusters for the plurality of products periodically (e.g., every three weeks). For instance, after a period of time has elapsed (e.g., three weeks), the promotional forecasting computing system 104 may re-perform block 506 to segment and cluster the plurality of products to determine the product segments. Additionally, and/or alternatively, the promotional forecasting computing system 104 may retrain the plurality of promotional forecasting ML-AI models as well. In some instances, the promotional forecasting computing system 104 may re-perform block 506 and/or retrain the plurality of promotional forecasting ML-AI models based on receiving new historical data.

Additionally, and/or alternatively, the promotional forecasting computing system 104 may determine to retrain the plurality of promotional forecasting ML-AI models based one or more triggers (e.g., a confidence factor, tracking the performance of the ML-AI models, and/or receiving new historical data). For instance, the promotional forecasting computing system 104 may track the performance of the plurality of promotional forecasting ML-AI models to determine detection of systematic bias. For example, the promotional forecasting computing system 104 may use the most recent eight weeks of actual data and/or one or more forecast accuracy metrics (e.g., bias, weighted mean absolute percentage error (wMAPE), and/or root-mean square deviation (RMSE)) to determine whether to retrain the ML-AI models.

For example, referring back to block 406, the promotional forecasting computing system 104 may determine two split points for the standardized historical data (e.g., at 52 weeks and 96 weeks). The first split point may indicate the split between test and training data. The second split point may indicate the split between the test data and the scoring data. The promotional forecasting computing system 104 may use the scoring data to score the promotional forecasting ML-AI models.

In some variations, the promotional forecasting computing system 104 may use different standardized historical data for training the ML-AI models (e.g., the test and training data) and for scoring the ML-AI models (e.g., the scoring data). For example, the promotional forecasting computing system 104 may use the standardized historical data at the product segment level (e.g., the product segment and storefront combination level) to train the ML-AI models. The promotional forecasting computing system 104 may use the standardized historical data at the SKU level (e.g., the SKU and storefront combination level) to score the ML-AI.

In other words, at block 408, the promotional forecasting computing system 104 may determine the product sales forecast associated with the scoring data (e.g., sales for a particular SKU over a period of time such as the next eight weeks). The promotional forecasting computing system 104 may use the trained promotional forecasting ML-AI models to score the promotional forecasting ML-AI models. Based on the forecast computed from the scoring data, the promotional forecasting computing system 104 may determine a confidence factor by analyzing if the forecasted output is within the lower and upper confidence bounds of mean historical sales over the period of training data (e.g., two years).

In some variations, at block 408, the promotional forecasting computing system 104 may score the promotional forecasting ML-AI models for new products and new storefronts differently from other products and/or other storefronts. This will be described in more detail in FIG. 8H below.

At block 410, the promotional forecasting computing system 104 stores the plurality of trained promotional forecasting ML-AI models in a database. For instance, the promotional forecasting computing system 104 may include and/or be associated with a database and may store the trained promotional forecasting ML-AI models in the database. Additionally, and/or alternatively, the promotional forecasting computing system 104 may receive new historical data periodically (e.g., every week). As such, the promotional forecasting computing system 104 may determine whether to retrain the trained promotional forecasting ML-AI models after receiving the new historical data and/or periodically (e.g., every three weeks). For instance, in some examples, the promotional forecasting computing system 104 may retrain the trained promotional forecasting ML-AI models every week after receiving the new historical data. Additionally, and/or alternatively, the promotional forecasting computing system 104 may receive user input indicating whether to retrain the promotional forecasting ML-AI models. For instance, an operator may seek to retrain the ML-AI models every six months.

Figure 7:
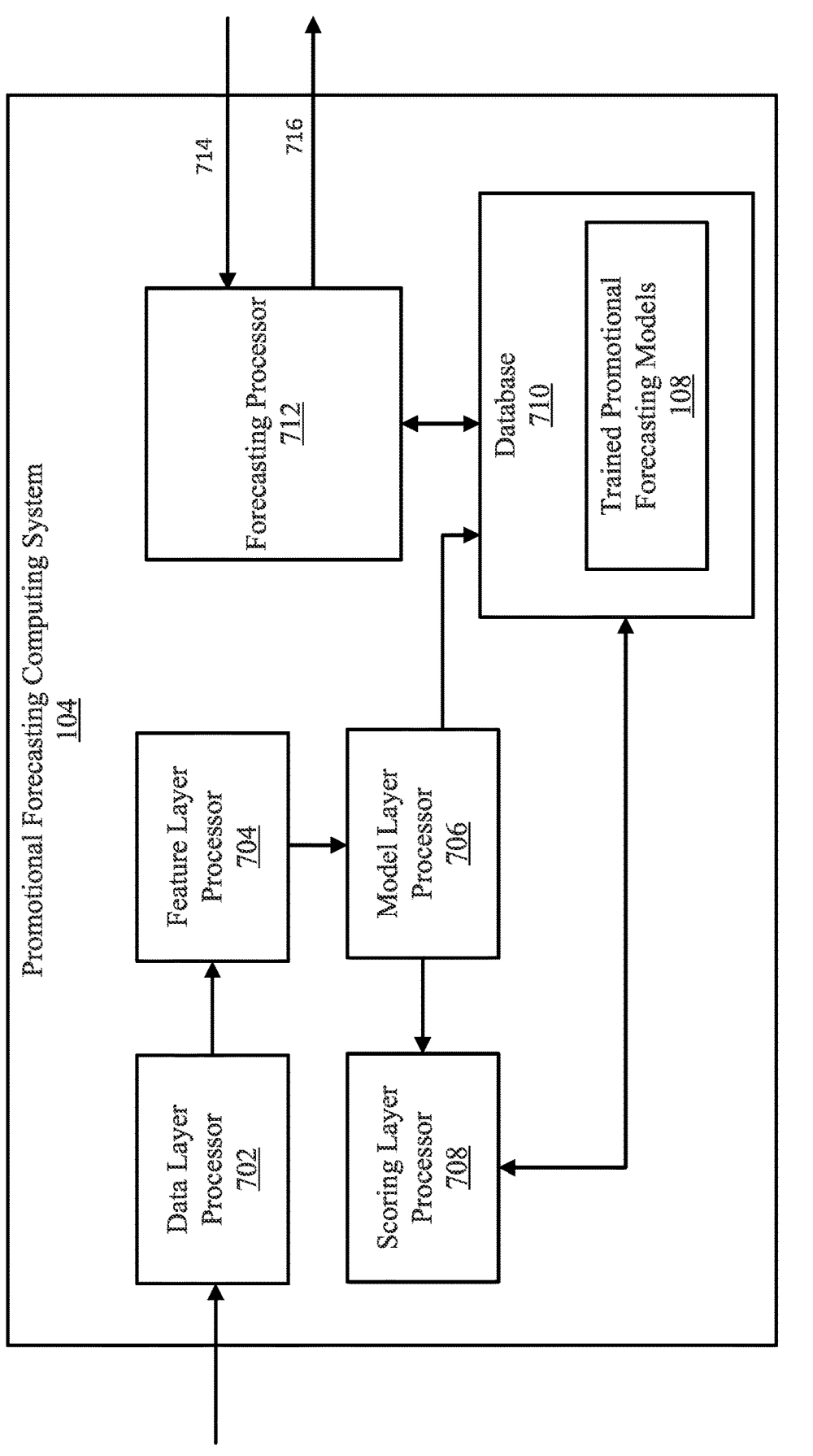
FIG. 7 is another simplified block diagram depicting an exemplary promotional forecasting computing system in accordance with one or more examples of the present application.

FIG. 7 is a simplified block diagram depicting an exemplary promotional forecasting computing system in accordance with one or more examples of the present application. For instance, the promotional forecasting computing system 104 includes a data layer processor 702, a feature layer processor 704, a model layer processor 706, a scoring layer processor 708, a database 710, and a forecasting processor 712. The database 710 may include the trained promotional forecasting models 108. The processors 702-708 and 712 may be hardware processors (e.g., controllers, computing devices, computing entities, and/or other hardware) and/or engines (e.g., instructions stored in memory and when executed by one or more hardware processors, are configured to perform the method and processes described herein). The database 710 may include any type of memory components that can store information such as the trained promotional forecasting models 108.

FIGS. 8A-8I show process flowcharts for forecasting promotional products in accordance with one or more examples of the present application. FIGS. 8A-8I will be used to describe the functionality of the processors 702-708 and 712 of FIG. 7. For example, the blocks of FIG. 8A may be performed by the data layer processor 702. For instance, the flowchart 800 may be part of block 402 shown in FIG. 4. For example, at block 802 the data layer processor 702 may obtain information from the data sources (e.g., data sources 102 and/or the facility computing systems 112). The information may include sales data, calendar information, and store attributes associated with the storefront.

At block 804, the data layer processor 702 computes average sales for a time period (e.g., 4, 8, 13, 16, 20, 26 weeks) based on the obtained information. At block 806, the data layer processor 702 computes lagged sales (e.g., lagged average sales) for a time period based on the computed average sales. At block 808, the data layer processor 702 computes minimum and maximum sales for a time period. At block 810, the data layer processor 702 computes lagged minimum and maximum sales for a time period. At block 812, the data layer processor 702 computes direct lag sale features. At block 814, the data layer processor 702 computes seasonality features. Then, for each of blocks 804-814, the data layer processor 702 may provide the results to the next processor (e.g., the feature layer processor 704), which as explained above, may populate one or more arrays using the results to generate the standardized historical data that is used to train the ML-AI models.

Figure 8A:
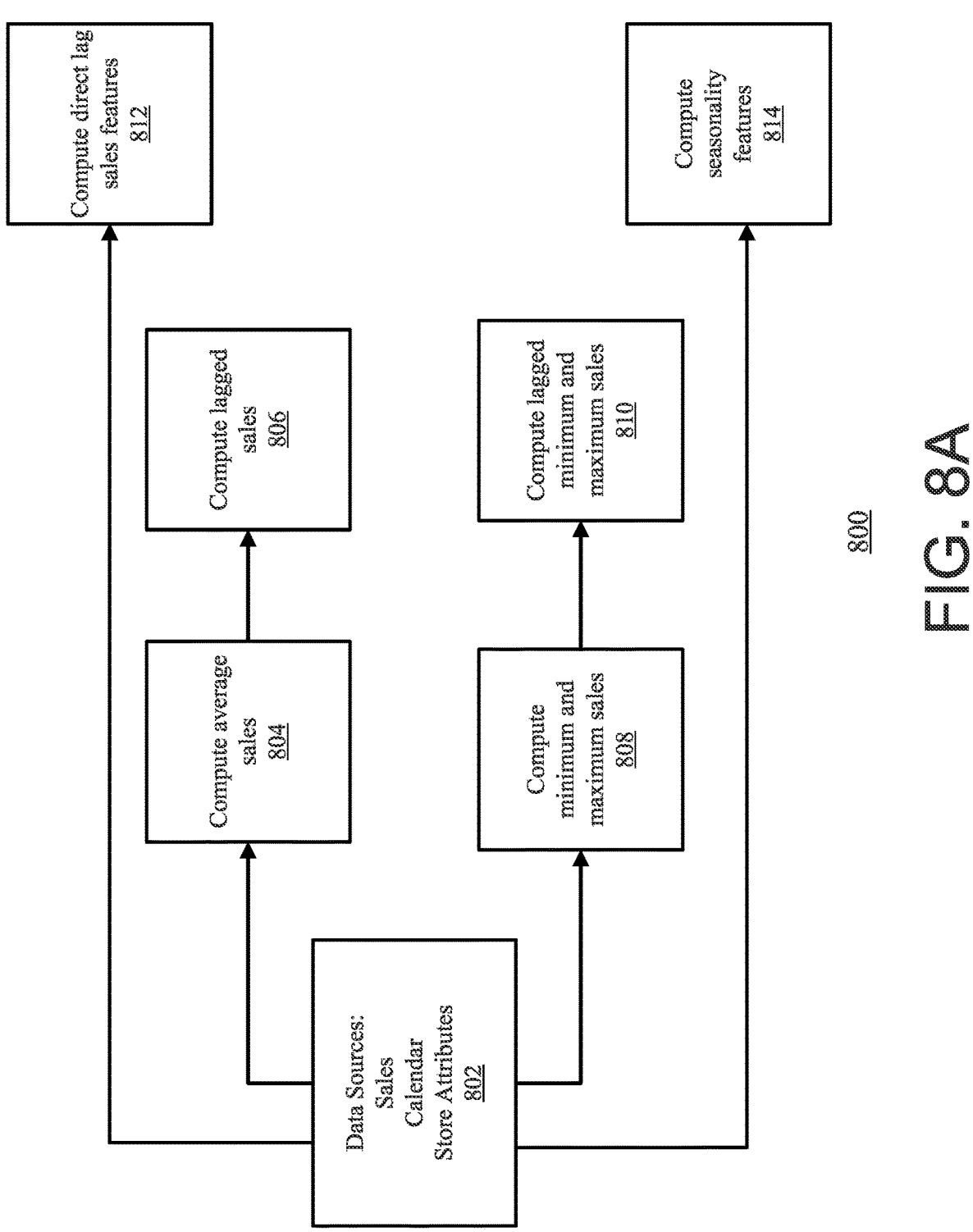
FIGS. 8A-8I show process flowcharts for forecasting demand of promotional products in accordance with one or more examples of the present application.
Figure 8B:
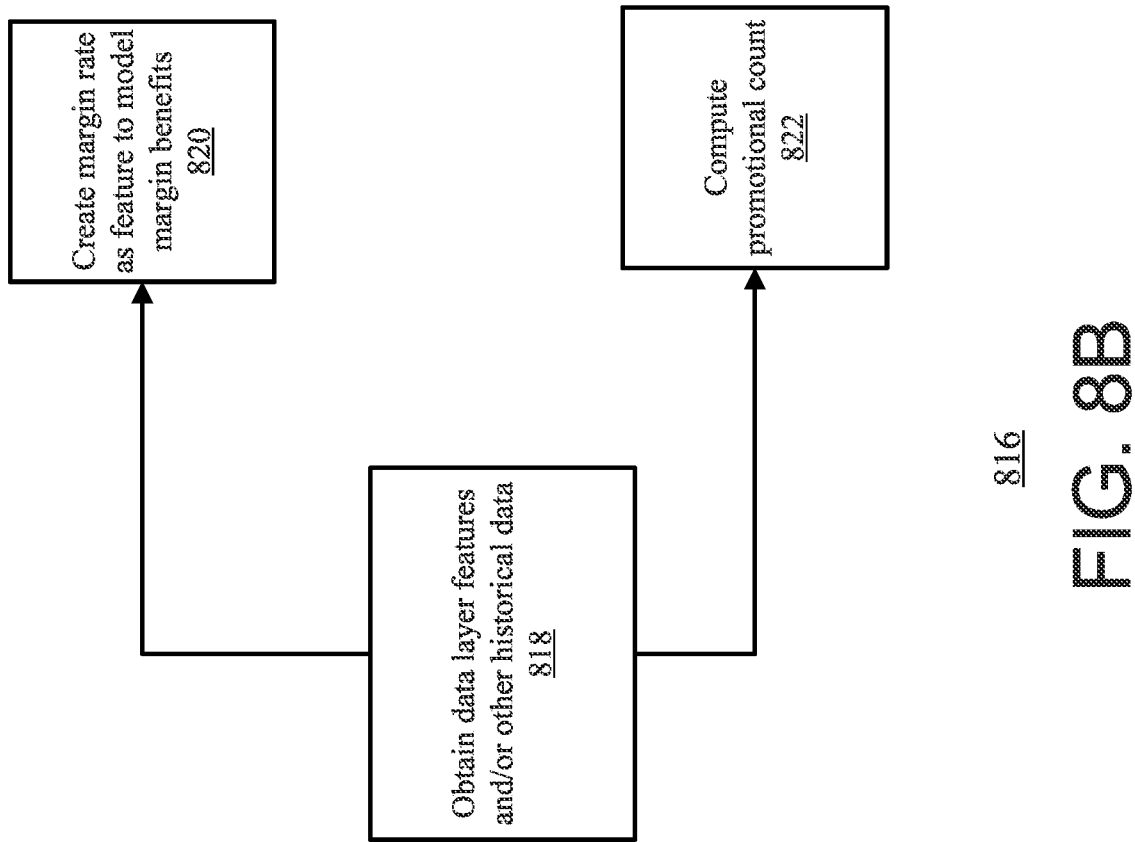

Referring to FIG. 8B, the feature layer processor 704 may perform the flowchart 816. Flowchart 816 may be part of block 502 described in FIG. 5 above. For instance, at block 818, the feature layer processor 704 obtains the data layer features (e.g., the features determined by the data layer processor 702) and/or other historical data such as promotional feature data. For instance, the promotional feature data may include and/or indicate promotional SKU features, promotional store features, and/or advertisement features. At block 820, the feature layer processor 704 creates margin rate as a feature to model margin benefits. The margin rate for the products is described above. At block 822, the feature layer processor 704 computes promotional counts for a time period (e.g., 4, 8, 13, 16, 20 weeks). Additionally, and/or alternatively, the feature layer processor 704 may determine additional features such as seasonality features (e.g., indicating hidden periodic patterns), trend features (e.g., indicating spikes and/or sharp spikes in demand), promotional recency (e.g., indicating when a promotion was last applied), and/or promotional frequency (e.g., indicating how often this promotion was applied).

Figure 8C:
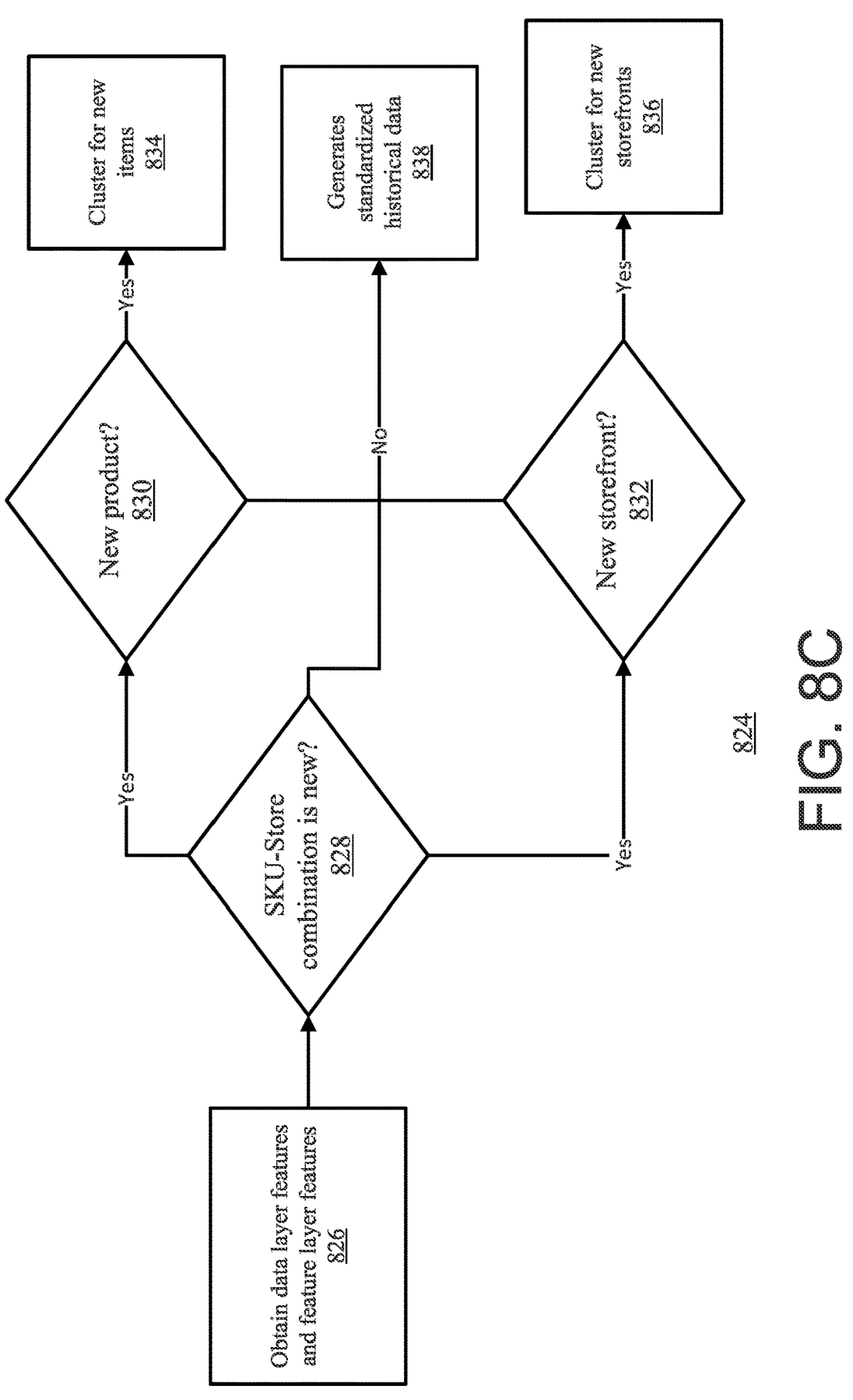

Referring to FIG. 8C, the feature layer processor 704 may perform the flowchart 826. Flowchart 826 may be part of block 508 described in FIG. 5 above. For example, at block 826, the feature layer processor 704 obtains data layer features (e.g., based on flowchart 800) and feature layer features (e.g., based on flowchart 816). At block 828, the feature layer processor 704 determines whether the SKU-store combination is new. If yes, the feature layer processor 704 performs blocks 830 and 832 to check whether it is a new product or a new storefront. If yes, then the feature layer processor 704 performs blocks 834 and 836, which includes clustering for new items and clustering for new storefronts using for example, the k-medoids algorithm described above. If no to either blocks 828, 830, or 832, the feature layer processor 704 performs block 838 and generates the standardized historical data.

Figure 8D:
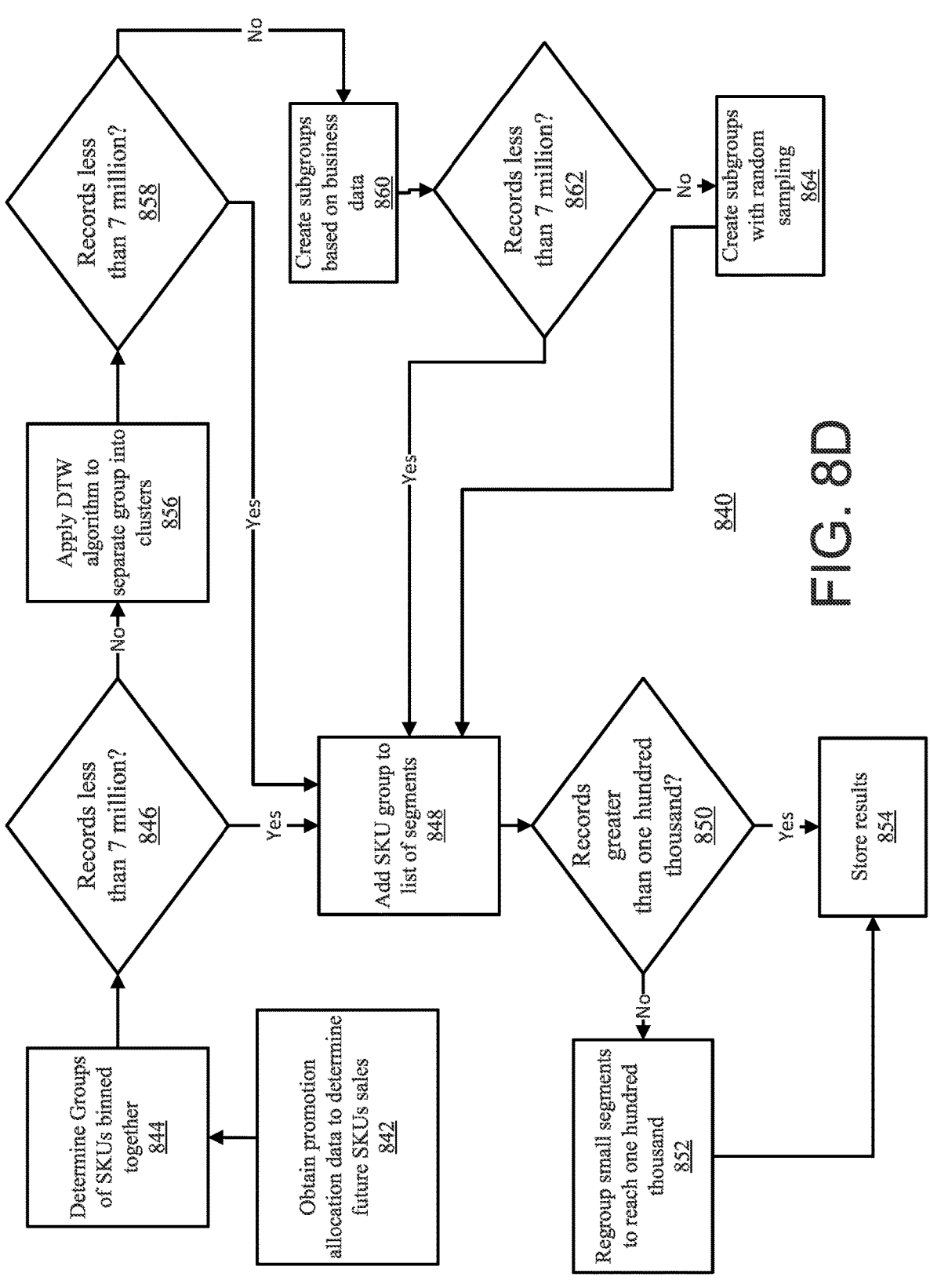

Referring to FIG. 8D, the feature layer processor 704 may perform the flowchart 840. Flowchart 840 may be part of block 506 described in FIG. 5 above. At block 842, the feature layer processor 704 obtains promotion allocation data to determine future SKUs sales. At block 844, the feature layer processor 704 determines groups of SKUs binned (e.g., grouped) together. At block 846, the feature layer processor 704 determines whether the records of the groups binned together are less than 7 million. If yes, the flowchart 840 proceeds to block 848. If no, it proceeds to block 856. At block 856, the feature layer processor 704 applies DTW algorithm to separate group into clusters. At block 858, the feature layer processor 704 determines whether the records of the groups binned together are less than 7 million. If yes, the flowchart 840 proceeds to block 848. If not, it proceeds to block 860. At block 860, the feature layer processor 704 creates subgroups based on business data (e.g., rules). At block 862, the feature layer processor 704 determines whether the records of the groups binned together are less than 7 million. If yes, the flowchart 840 proceeds to block 848. If not, it proceeds to block 864. At block 864, the feature layer processor 704 creates subgroups with random sampling.

At block 848, the feature layer processor 704 adds the SKU groups to the list of segments (e.g., categorizes the SKU groups to a product segment). At block 850, the feature layer processor 704 determines whether records are greater than one hundred thousand. If yes, process 840 proceeds to block 852. At block 852, the feature layer processor 704 regroups small segments to reach one hundred thousand records. At block 854, the feature layer processor 704 stores the results.

Figure 8E:
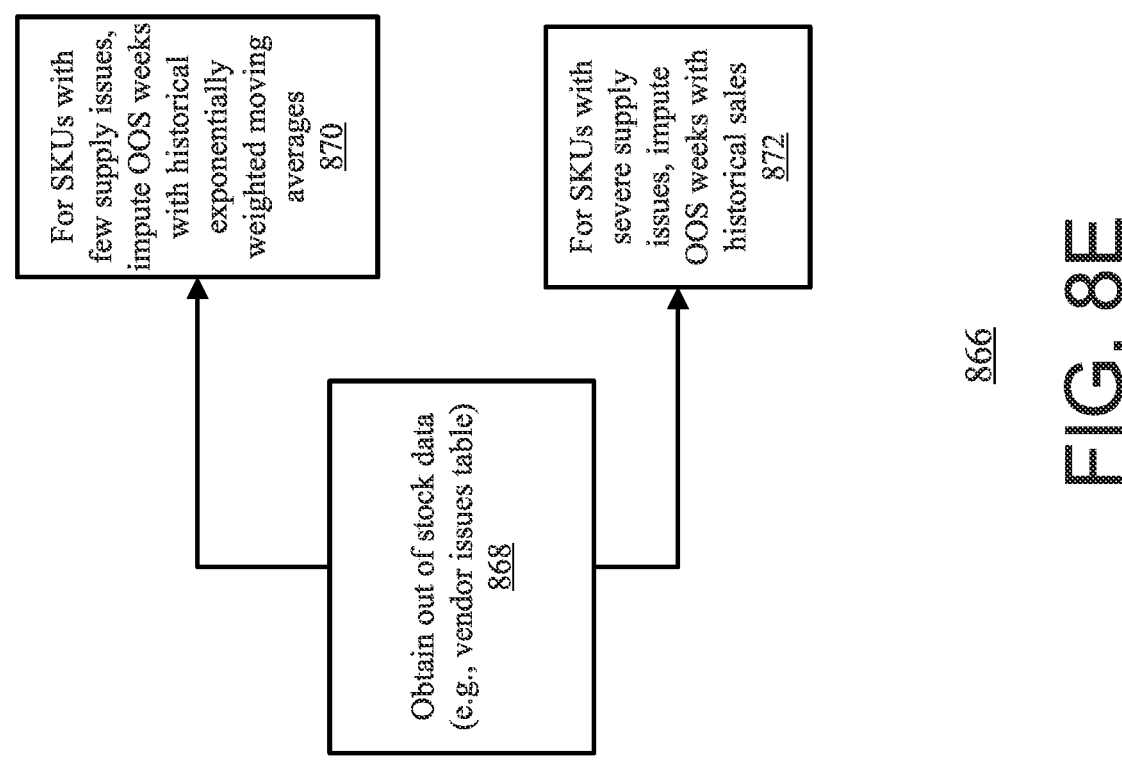

Referring to FIG. 8E, the feature layer processor 704 may perform the flowchart 866. Flowchart 866 may be part of block 504 described in FIG. 5 above. For instance, at block 868, the feature layer processor 704 obtains out of stock data (e.g., vendor issues table). At block 870, for SKUs with few supply issues (e.g., less than 70% or less than 50%), the feature layer processor 704 may impute out of stock (OOS) weeks with historical exponentially weighted moving averages from the weeks leading to the out-of-stock week when there were sales. For instance, the feature layer processor 704 may impute the OOS weeks with the three previous weeks of data. At block 872, for SKUs with severe supply issues, the feature layer processor 704 may impute OOS weeks with historical sales.

Figure 8F:
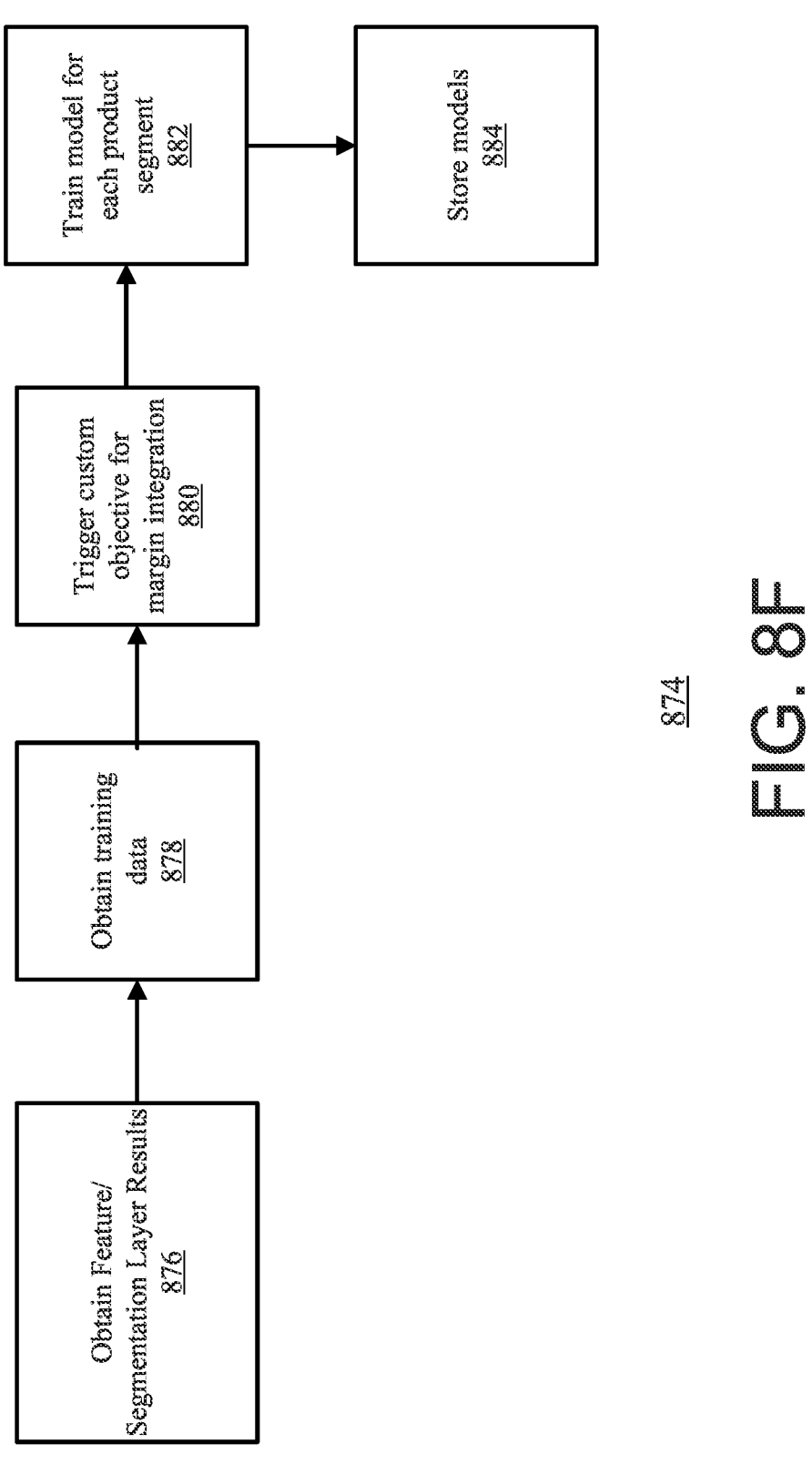

Referring to FIG. 8F, the model layer processor 704 may perform the flowchart 874. Flowchart 874 may be part of block 406 described in FIG. 4 above. For instance, at block 876, the model layer processor 704 obtains feature/segmentation layer results based on the above. At block 878, the model layer processor 704 obtains training data. At block 880, the model layer processor 704 triggers custom objectives for margin integration. For instance, the model layer processor 704 may use a LightGBM ML-AI model that is based on maximizing accuracy of the forecast. Additionally, and/or alternatively, the model layer processor 704 may use a modified ML-AI model (e.g., a modified LightGBM model) such as by erring on the side of understocking all of the products and/or understocking products that have a lower sales velocity and overstocking items with a high sales velocity. At block 882, the model layer processor 704 trains models for each product segment. At block 884, the model layer processor 704 stores the models (e.g., in database 710).

Figure 8G:
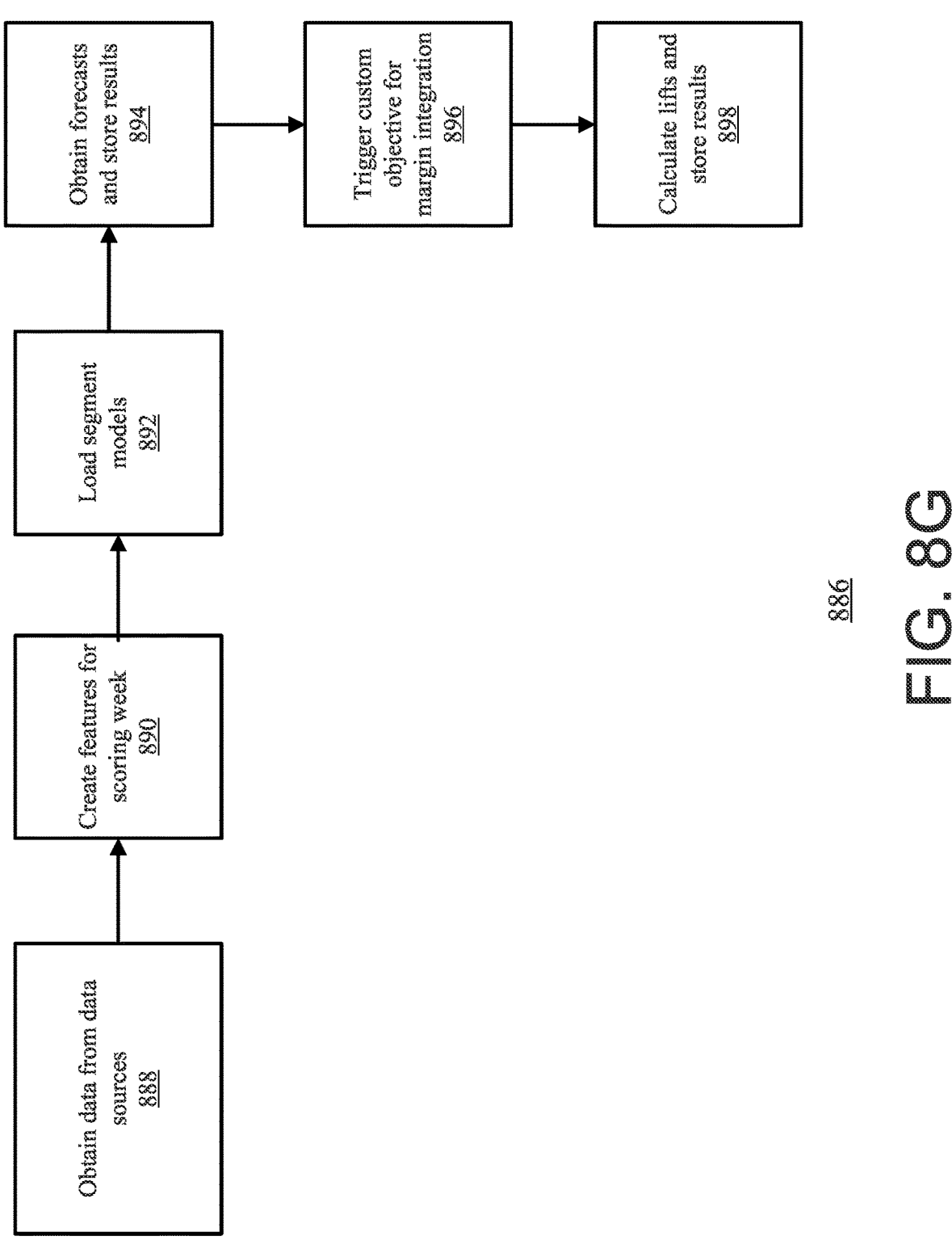

Referring to FIG. 8G, the scoring layer processor 708 may perform the flowchart 886. Flowchart 886 may be part of block 408 described in FIG. 4 above. For instance, at block 880, the scoring layer processor 708 obtains data from data sources (e.g., data sources 102 and/or the facility computing systems 112). The data may include sales, calendar, store attributes, promotional SKU features, promotional store features, advertisement features, and/or other features described above. At block 890, the scoring layer processor 708 creates features for scoring week. At block 892, the scoring layer processor 708 loads segment models. At block 884, the scoring layer processor 708 obtains forecasts and stores results. At block 896, the scoring layer processor 708 triggers custom objective for margin integration. At block 898, the scoring layer processor 708 calculates lifts and stores results.

Figure 8H:
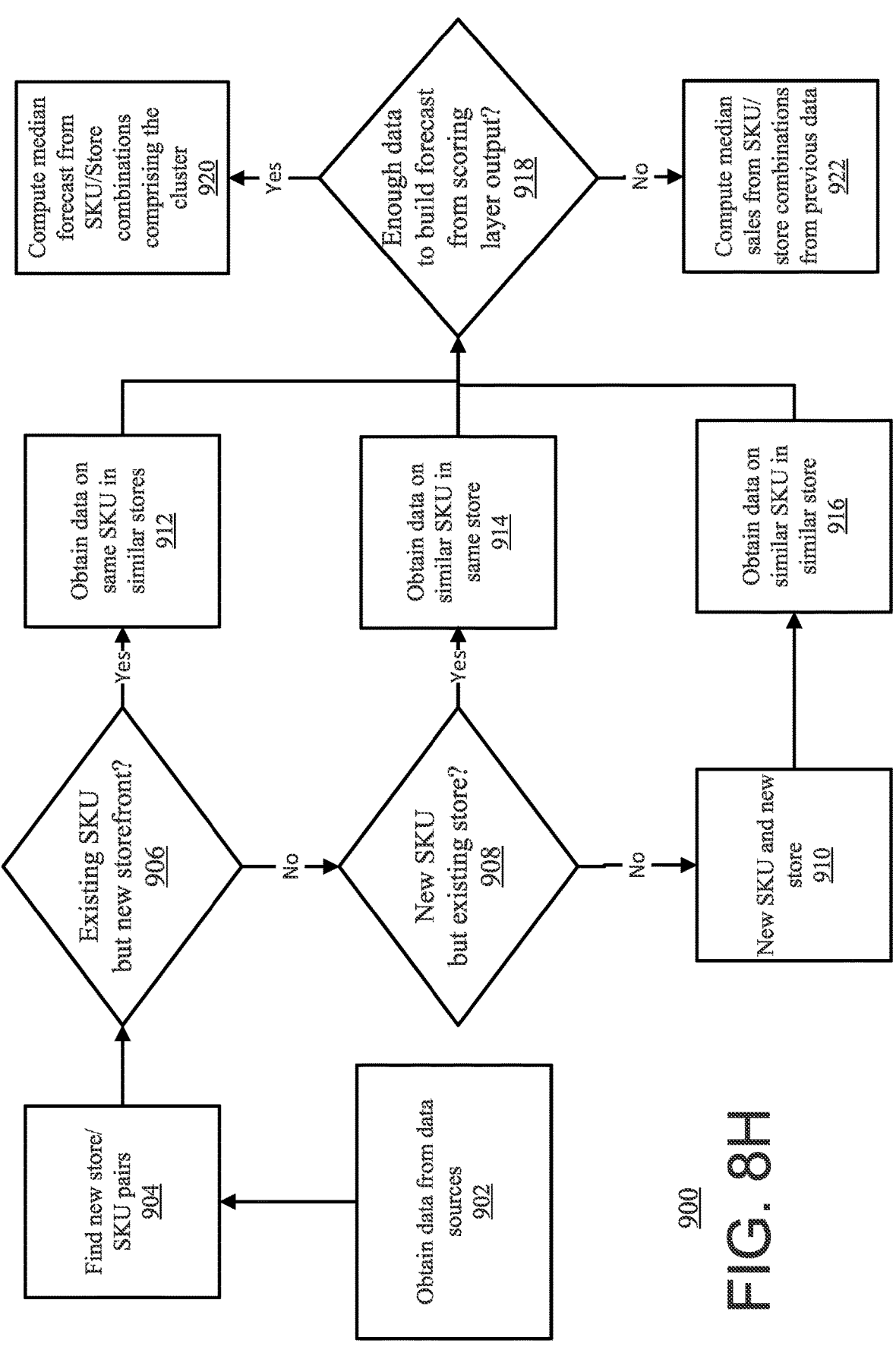

Referring to FIG. 8H, the scoring layer processor 708 may perform the flowchart 900. Flowchart 900 may be part of block 408 described in FIG. 4 above. For instance, at block 902, the scoring layer processor 708 obtains data from data sources (e.g., data sources 102 and/or the facility computing systems 112). The data may include scoring layer output, new SKU/store clustering layer information, and/or other information. At block 904, the scoring layer processor 708 finds new store/SKU pairs (e.g., combinations of new stores/SKUs). At block 906, the scoring layer processor 708 determines whether the pairs are for an existing SKU, but a new storefront (e.g., store). If not, process 900 moves to block 908. At block 908, the scoring layer processor 708 determines whether the pairs are for a new SKU, but an existing storefront. If not, process 900 moves to block 910. At block 910, the scoring layer processor 708 determines whether the pairs are new SKUs and new storefronts.

At block 912, the scoring layer processor 708 obtains data on the same SKU in similar storefronts. At block 914, the scoring layer processor 708 obtains data on similar SKUs in the same storefront. At block 916, the scoring layer processor 708 obtains data on similar SKU in similar storefronts. At block 918, the scoring layer processor 708 determines whether there is enough data to build a forecast from scoring layer output. If yes, at block 920, the scoring layer processor 708 computes median forecast from SKU/store combinations comprising the cluster. If no, at block 922, the scoring layer processor 708 computes median sales from SKU/store combinations from previous data.

Figure 8I:
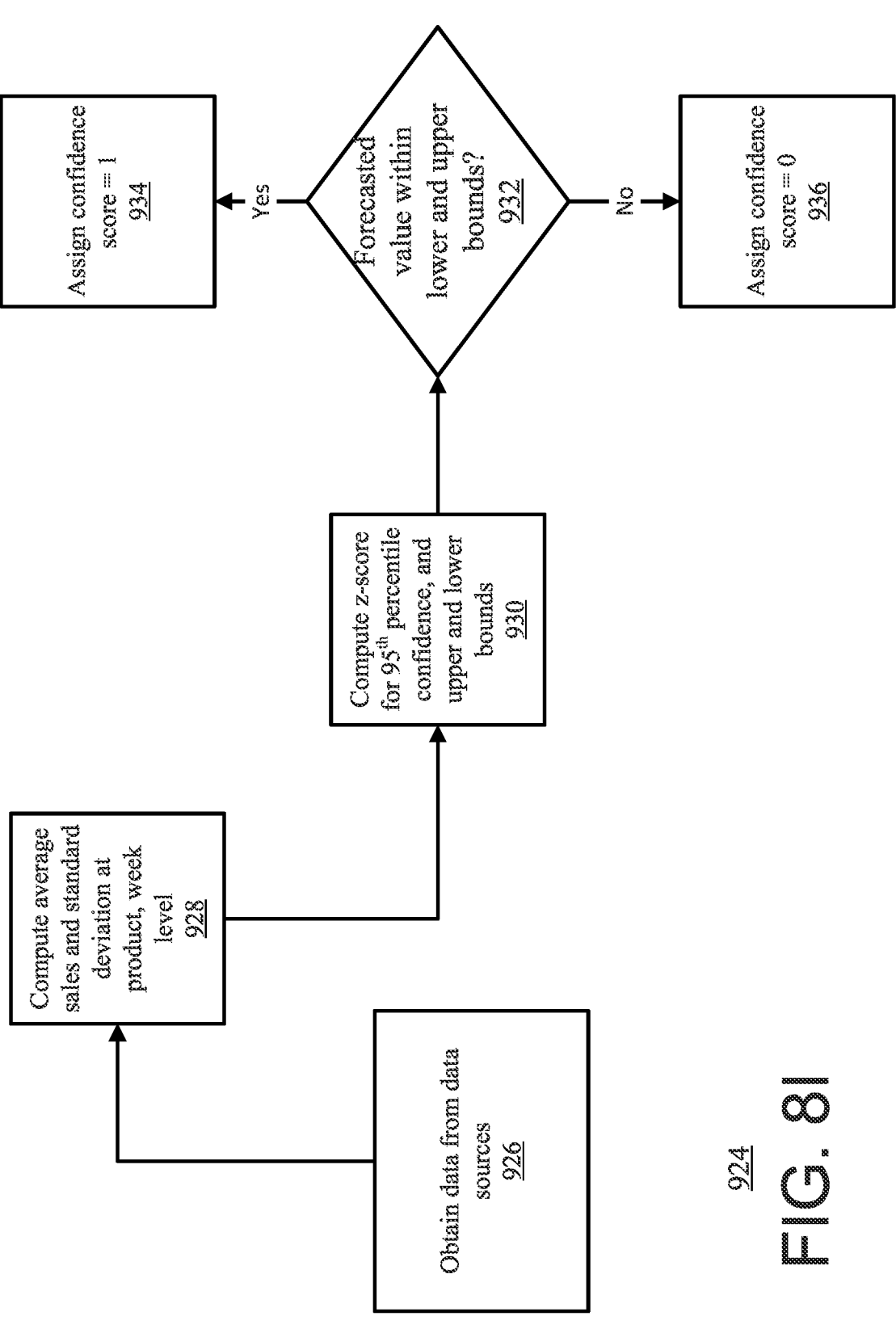

Referring to FIG. 8I, the scoring layer processor 708 may perform the flowchart 924. Flowchart 924 may be part of block 408 described in FIG. 4 above. For instance, at block 926, the scoring layer processor 708 obtains data from data sources (e.g., data sources 102 and/or the facility computing systems 112). The data may include data and feature layer features. At block 928, the scoring layer processor 708 computes average sales and standard deviation at product, week level. At block 930, the scoring layer processor 708 computes z-score for 95th percentile confidence and upper and lower bounds. At block 932, the scoring layer processor 708 determines whether forecasted value is within lower and upper bounds. If yes, at block 934, the scoring layer processor 708 assigns a confidence score of 1. If no, at block 936, the scoring layer processor 708 assigns a confidence score of 0.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A method, comprising:

obtaining historical data for a plurality of products, wherein the historical data indicates external events associated with the plurality of products;

standardizing the historical data using a plurality of standardization processors to generate standardized historical data, wherein standardizing the historical data comprises:

processing the historical data using a natural language processing (NLP) algorithm to convert the external events indicated by the historical data into feature embeddings;

clustering the plurality of products into a plurality of product segments, wherein each of the plurality of product segments comprises one or more products from the plurality of products that are clustered together;

determining a subset of the historical data for a particular product, from a first product segment of the plurality of product segments, is inaccurate based on the feature embeddings associated with the external events from the historical data;

updating the subset of the historical data for the particular product that is inaccurate based on using the historical data from the first product segment to replace the subset of the historical data of the particular product; and generating the standardized historical data based on updating the historical data for the particular product that is inaccurate;

training a plurality of promotional forecasting machine learning-artificial intelligence (ML-AI) models using the standardized historical data, wherein the plurality of promotional forecasting ML-AI models comprise a plurality of parameters;

obtaining new historical data for the plurality of products;

in response to obtaining the new historical data, retraining the plurality of promotional forecasting ML-AI models comprising:

re-clustering, based on the new historical data, the plurality of products from the plurality of product segments into a plurality of new product segments to reduce a number of entries for each of the plurality of new products segments to a specific record value; and based on the new historical data and the plurality of new product segments, retraining the plurality of promotional forecasting ML-AI models to adjust the plurality of parameters of the plurality of promotional forecasting ML-AI models;

obtaining a new marketing promotion for the particular product;

determining, based on the particular product from the new marketing promotion, the first product segment from the plurality of new product segments;

determining one or more promotional forecasting ML-AI models from the plurality of retrained promotional forecasting ML-AI models to use for the new marketing promotion based on the first product segment, wherein each of the plurality of retrained promotional forecasting ML-AI models is associated with a product segment from the plurality of new product segments;

inputting promotional information associated with the new marketing promotion into the one or more determined promotional forecasting ML-AI models to forecast an amount of the particular product to provide to one or more storefronts; and providing product information indicating the amount of the particular product to one or more facility computing systems associated with the one or more storefronts.

2. The method of claim 1, wherein each of the plurality of retrained promotional forecasting ML-AI models is further associated with a storefront from a plurality of storefronts associated with an enterprise organization, and wherein determining the one or more promotional forecasting ML-AI model is based on:

comparing the first product segment with the plurality of new product segments; and comparing the one or more storefronts with the plurality of storefronts.

3. The method of claim 1, wherein inputting the promotional information associated with the new marketing promotion into the one or more determined promotional forecasting ML-AI models comprises:

inputting the promotional information into a first selected promotional forecasting ML-AI model associated with a first storefront, from the one or more storefronts, to forecast a first amount of the particular product to provide to the first storefront; and inputting the promotional information into a second selected promotional forecasting ML-AI model associated with a second storefront, from the one or more storefronts, to forecast a second amount of the particular product to provide to the second storefront, wherein the second amount is different from the first amount.

4. The method of claim 1, wherein obtaining the historical data for the plurality of products comprises:

determining lagging information for the plurality of products based on the historical data, and wherein training the plurality of promotional forecasting ML-AI models is further based on the lagging information.

5. The method of claim 1, wherein standardizing the historical data further comprises:

determining a plurality of features for the plurality of products, wherein each of the plurality of features indicates an input that is used for training the plurality of promotional forecasting ML-AI models; and populating one or more arrays based on the plurality of features, wherein the standardized historical data comprises the one or more arrays.

6. The method of claim 1, wherein clustering the plurality of products into the plurality of product segments comprises:

determining a plurality of sub-groups for the plurality of products using a dynamic time warping (DTW) algorithm; and determining the plurality of product segments based on determining whether each of the plurality of sub-groups exceeds a maximum data size limit.

7. The method of claim 6, wherein determining the plurality of product segments is further based on determining whether each of the plurality of sub-groups is below a minimum data size limit.

8. The method of claim 1, wherein standardizing the historical data comprises:

obtaining one or more indications indicating one or more new products or one or more new storefronts do not have historical data; and generating new product data for the one or more new products or new storefront data for the one or more new storefronts, and wherein generating the standardized historical data is based on the new product data or the new storefront data.

9. The method of claim 8, wherein generating the new product data or the new storefront data is based on determining similar products to the one or more new products or similar storefronts to the one or more new storefronts.

10. The method of claim 1, wherein determining the subset of the historical data for the particular product is inaccurate comprises:

determining one or more lost sales entries within the historical data based on the feature embeddings associated with the external events, wherein the one or more lost sales entries indicate the particular product being out of stock during a time period;

generating new sales data for the one or more lost sales entries based on the historical data from the first product segment; and populating the one or more lost sales entries with the new sales data.

11. The method of claim 1, wherein the plurality of promotional forecasting ML-AI models are Light gradient-boosting machine (LightGBM) models, and wherein training the plurality of promotional forecasting ML-AI models is based on using a customized loss function.

12. The method of claim 11, wherein the customized loss function is based on a sales velocity associated with the particular product and a margin rate associated with the particular product.

13. The method of claim 12, wherein the customized loss function L is based on:

$$L = 0.5 * w_1(y-a)^2 - w_2(m \times y) - w_3(v \times y)$$

where $w_1$, $w_2$, and $w_3$ are weights, y is a forecasted amount, a is an actual amount, m is the margin rate associated with the particular product, and v is the sales velocity associated with the particular product.

14. The method of claim 1, further comprising:

storing the plurality of retrained promotional forecasting ML-AI models in memory.

15. The method of claim 14, wherein retraining the plurality of promotional forecasting ML-AI models is further based on a set amount of time elapsing.

16. A promotional forecasting computing system (PFCS), comprising:

one or more processors; and a non-transitory computer-readable medium having processor-executable instructions stored thereon, wherein the processor-executable instructions, when executed by the one or more processors, facilitate:

obtaining historical data for a plurality of products, wherein the historical data indicates external events associated with the plurality of products;

standardizing the historical data using a plurality of standardization processors to generate standardized historical data, wherein standardizing the historical data comprises:

processing the historical data using a natural language processing (NLP) algorithm to convert the external events indicated by the historical data into feature embeddings;

clustering the plurality of products into a plurality of product segments, wherein each of the plurality of product segments comprises one or more products from the plurality of products that are clustered together;

determining a subset of the historical data for a particular product, from a first product segment of the plurality of product segments, is inaccurate based on the feature embeddings associated with the external events from the historical data;

updating the subset of the historical data for the particular product that is inaccurate based on using the historical data from the first product segment to replace the subset of the historical data of the particular product; and generating the standardized historical data based on updating the historical data for the particular product that is inaccurate;

training a plurality of promotional forecasting machine learning-artificial intelligence (ML-AI) models using the standardized historical data, wherein the plurality of promotional forecasting ML-AI models comprise a plurality of parameters;

obtaining new historical data for the plurality of products;

in response to obtaining the new historical data, retraining the plurality of promotional forecasting ML-AI models comprising:

re-clustering, based on the new historical data, the plurality of products from the plurality of product segments into a plurality of new product segments to reduce a number of entries for each of the plurality of new products segments to a specific record value; and based on the new historical data and the plurality of new product segments, retraining the plurality of promotional forecasting ML-AI models to adjust the plurality of parameters of the plurality of promotional forecasting ML-AI models;

obtaining a new marketing promotion for the particular product;

determining, based on the particular product from the new marketing promotion, the first product segment from the plurality of new product segments, wherein each of the plurality of product segments comprises a set of products that are clustered together;

determining one or more promotional forecasting ML-AI models from the plurality of retrained promotional forecasting ML-AI models to use for the new marketing promotion based on the first product segment, wherein each of the plurality of retrained promotional forecasting ML-AI models is associated with a product segment from the plurality of new product segments;

inputting promotional information associated with the new marketing promotion into the one or more determined promotional forecasting ML-AI models to forecast an amount of the particular product to provide to one or more storefronts; and providing product information indicating the amount of the particular product to one or more facility computing systems associated with the one or more storefronts.

17. The PFCS of claim 16, wherein each of the plurality of retrained promotional forecasting ML-AI models is further associated with a storefront from a plurality of storefronts associated with an enterprise organization, and wherein determining the one or more promotional forecasting ML-AI models is based on:

comparing the first product segment with the plurality of new product segments; and comparing the one or more storefronts with the plurality of storefronts.

18. The PFCS of claim 16, wherein inputting the promotional information associated with the new marketing promotion into the one or more determined promotional forecasting ML-AI models comprises:

inputting the promotional information into a first selected promotional forecasting ML-AI model associated with a first storefront, from the one or more storefronts, to forecast a first amount of the particular product to provide to the first storefront; and inputting the promotional information into a second selected promotional forecasting ML-AI model associated with a second storefront, from the one or more storefronts, to forecast a second amount of the particular product to provide to the second storefront, wherein the second amount is different from the first amount.

19. The PFCS of claim 16, wherein determining the subset of the historical data for the particular product is inaccurate comprises:

determining one or more lost sales entries within the historical data based on the feature embeddings associated with the external events, wherein the one or more lost sales entries indicate the particular product being out of stock during a time period;

generating new sales data for the one or more lost sales entries based on the historical data from the first product segment; and populating the one or more lost sales entries with the new sales data.

20. A non-transitory computer-readable medium having processor-executable instructions stored thereon, wherein the processor-executable instructions, when executed, facilitate:

obtaining historical data for a plurality of products, wherein the historical data indicates external events associated with the plurality of products;

standardizing the historical data using a plurality of standardization processors to generate standardized historical data, wherein standardizing the historical data comprises:

processing the historical data using a natural language processing (NLP) algorithm to convert the external events indicated by the historical data into feature embeddings;

clustering the plurality of products into a plurality of product segments, wherein each of the plurality of product segments comprises one or more products from the plurality of products that are clustered together;

determining a subset of the historical data for a particular product, from a first product segment of the plurality of product segments, is inaccurate based on the feature embeddings associated with the external events from the historical data;

updating the subset of the historical data for the particular product that is inaccurate based on using the historical data from the first product segment to replace the subset of the historical data of the particular product; and generating the standardized historical data based on updating the historical data for the particular product that is inaccurate;

training a plurality of promotional forecasting machine learning-artificial intelligence (ML-AI) models using the standardized historical data, wherein the plurality of promotional forecasting ML-AI models comprise a plurality of parameters;

obtaining new historical data for the plurality of products;

in response to obtaining the new historical data, retraining the plurality of promotional forecasting ML-AI models comprising:

re-clustering, based on the new historical data, the plurality of products from the plurality of product segments into a plurality of new product segments to reduce a number of entries for each of the plurality of new products segments to a specific record value; and based on the new historical data and the plurality of new product segments, retraining the plurality of promotional forecasting ML-AI models to adjust the plurality of parameters of the plurality of promotional forecasting ML-AI models;

obtaining a new marketing promotion for the particular product;

determining, based on the particular product from the new marketing promotion, the first product segment from the plurality of new product segments, wherein each of the plurality of product segments comprises a set of products that are clustered together;

determining one or more promotional forecasting ML-AI models from the plurality of retrained promotional forecasting ML-AI models to use for the new marketing promotion based on the first product segment, wherein each of the plurality of retrained promotional forecasting ML-AI models is associated with a product segment from the plurality of new product segments;

inputting promotional information associated with the new marketing promotion into the one or more determined promotional forecasting ML-AI models to forecast an amount of the particular product to provide to one or more storefronts; and providing product information indicating the amount of the particular product to one or more facility computing systems associated with the one or more storefronts.

* * * * *